United States Patent
Hagiwara et al.

(10) Patent No.: US 7,583,508 B2
(45) Date of Patent: Sep. 1, 2009

(54) BAND-SHAPED INPUT DEVICE AND ELECTRONIC DEVICE

(75) Inventors: Yasuji Hagiwara, Fukushima-ken (JP); Junichi Inamura, Fukushima-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 426 days.

(21) Appl. No.: 10/434,757

(22) Filed: May 9, 2003

(65) Prior Publication Data

US 2004/0037051 A1 Feb. 26, 2004

(30) Foreign Application Priority Data

| | | |
|---|---|---|
| May 10, 2002 | (JP) | 2002-135985 |
| Nov. 12, 2002 | (JP) | 2002-328115 |
| Mar. 6, 2003 | (JP) | 2003-060356 |

(51) Int. Cl.
*H05K 1/00* (2006.01)

(52) U.S. Cl. .................. 361/749; 361/750; 174/254

(58) Field of Classification Search ................ 361/749; 174/254; 340/573.1; 381/315, 71.6, 716
See application file for complete search history.

(56) References Cited

U.S. PATENT DOCUMENTS

| | | | | | |
|---|---|---|---|---|---|
| 3,944,803 | A | * | 3/1976 | Chao | 362/108 |
| 4,681,462 | A | * | 7/1987 | Lloyd | 368/69 |
| 4,685,448 | A | * | 8/1987 | Shames et al. | 600/23 |
| 4,909,189 | A | * | 3/1990 | Minotti | 119/859 |
| 5,370,082 | A | * | 12/1994 | Wade | 119/859 |
| 5,793,875 | A | * | 8/1998 | Lehr et al. | 381/313 |
| 5,952,925 | A | * | 9/1999 | Secker | 340/573.2 |
| 5,980,498 | A | * | 11/1999 | Brown et al. | 604/327 |
| 6,193,385 | B1 | * | 2/2001 | Maki et al. | 362/108 |
| 6,594,370 | B1 | * | 7/2003 | Anderson | 381/315 |
| 6,850,224 | B2 | * | 2/2005 | Baughman | 345/163 |
| 6,892,678 | B2 | * | 5/2005 | Cheng | 119/859 |
| 6,898,295 | B2 | * | 5/2005 | Inamura et al. | 381/385 |
| 6,970,090 | B1 | * | 11/2005 | Sciarra | 340/573.1 |
| D513,249 | S | * | 12/2005 | Hirakawa et al. | D14/223 |
| 6,991,364 | B2 | * | 1/2006 | Yang | 368/281 |
| 7,060,889 | B2 | * | 6/2006 | Bellak | 84/741 |
| 7,236,751 | B2 | * | 6/2007 | Ono | 455/90.3 |
| 2002/0090099 | A1 | * | 7/2002 | Hwang | 381/312 |
| 2005/0219843 | A1 | * | 10/2005 | Arell et al. | 362/253 |

* cited by examiner

*Primary Examiner*—Tuan T Dinh
(74) *Attorney, Agent, or Firm*—Brinks Hofer Gilson & Lione

(57) ABSTRACT

A strap controller (input device) includes a band-shaped strap, a connecting member which connects the strap in a looped shape, and a connecting cord which connects the connecting member to a portable audio device.

9 Claims, 22 Drawing Sheets

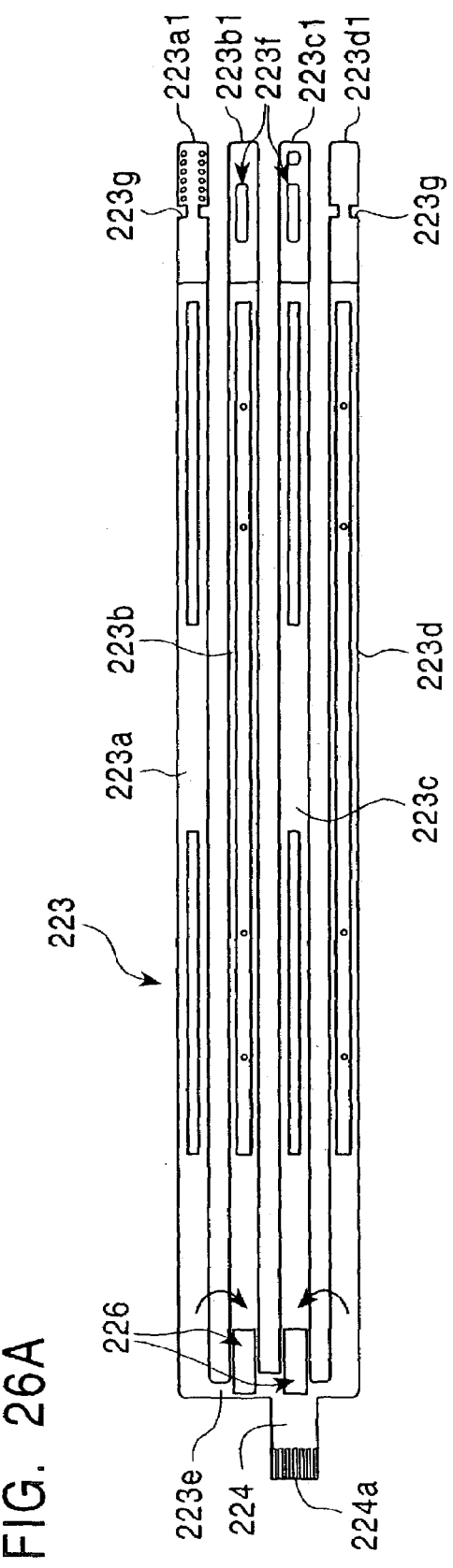
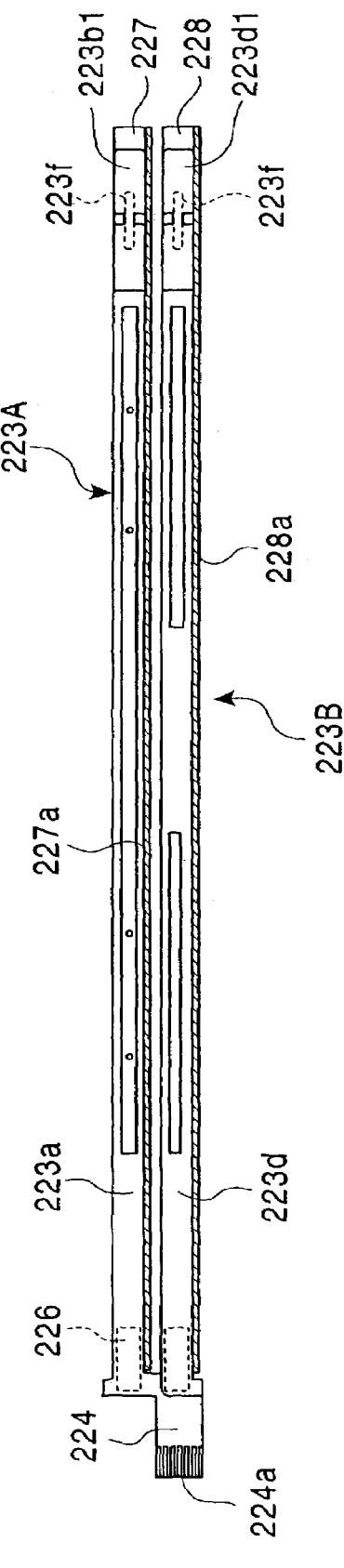
FIG. 26A
FIG. 26B

BAND-SHAPED INPUT DEVICE AND ELECTRONIC DEVICE

BACKGROUND OF THE INVENTION

1. Field of the Invention

The present invention relates to an input device which operates an electronic device and inputs information therefrom by electrical signals, and an electronic device using the input device.

2. Description of the Related Art

FIG. 34 is a diagram which illustrates an example of a portable audio device having a remote control device (input device). A disc-shaped operating portion 1232 is provided on the top of housing of a portable audio device 1231 shown in the drawing, for performing switching operations using seesaw actions in a crossing direction. With the operating portion 1232, operations such as playback/stop for an audio disk, skipping (skip to the next tune), back-skipping (return to the previous tune) and so forth can be performed.

A remote control device R2 of the portable audio device 1231 includes an operating portion S2 for operating the portable audio device 1231, coated wires 1235 for audio signals connected to a case 1233 having the operating portion S2, a pair of earphones 1236 connected to one end portion of the coated wires 1235, and a cord-shaped coated wire 1238 having a plug 1237 on one end thereof attached to the case 1233. The coated wire 1238 is integrally formed with coated wires (not shown) for handling audio signals and taking signals from the operating portion S2.

The operating portion S2 includes the box-shaped case 1233 made up of a synthetic resin molding, and an operating member 1234 exposed from the case 1233 for performing switching operations using seesaw movement in a crossing direction, the same as the operating portion 1232. Accordingly, with the operating member 1234, operations the same as the operating portion 1232 equipped on the housing of the portable audio device 1231 can be performed.

The remote control device R2 is detachably attached to the portable audio device 1231 by inserting the plug 1237 into a jack portion of the portable audio device 1231 or extracting the plug 1237 therefrom. With regard to a commonly used feature of the above-described portable audio device 1231, the earphones 1236 are put in the ears of a user, with the portable audio device 1231 placed in a clothing pocket or a bag, and playback/stop operations of music can be performed with the operating portion S2 of the remote control device R2.

Moreover, the present assignee has proposed a remote control device having an operating member formed on flexible a cord-shaped exterior member as a remote control device applicable to portable audio devices (e.g., Japanese Unexamined Patent Application Publication No. 2001-258078).

In recent years, there has been a trend toward downsizing with regard to remote control devices mounted on portable various types of electronic devices, not just portable audio devices. However, in the event that the remote control device R2 having the above-described configuration shown in FIG. 34 is downsized, consequently, the operating portion S2 is also downsized as well, and accordingly, the width and stroke length of the operating member 1234 which performs seesaw movement are reduced, leading to a problem in that operability deteriorates. Moreover, with regard to the operating portion S2, some operating portions have employed multiple button switches instead of the operating member 1234, and in such cases, deterioration of operability becomes more marked in the event of downsizing the operating portion.

SUMMARY OF THE INVENTION

The present invention has been made in light of the aforementioned problems, and accordingly, it is an object thereof to provide an input device having excellent operability and a downsized body. Another object of the present invention is to provide an electronic device having the aforementioned features.

In order to achieve the aforementioned objects, the present invention employs the following configuration.

According to a first aspect of the present invention, an input device comprises a neck-hung strap, and a connecting member connecting the strap in a looped shape, wherein one or more input portions are embedded in the strap, and the connecting member includes connecting means for connecting the input portion and an electronic device.

According to a second aspect of the present invention, an input device comprises a belt-shaped strap such as a handheld strap or the like, a connecting member provided on one end of the strap, and one or more input portions built into the strap, wherein connecting means are provided for connecting the input portion and an electronic device to the connecting member.

The strap may include one or more belt-shaped flexible layered members of boards having resistor layers or electrode layers individually, and with the one pair of layered boards, a slit may be formed on the other end in the length-wise direction of one board thereof, with a tip portion formed on the other end of the other flexible board in the length-wise direction thereof and inserted through the slit so as to be movable by layer slippage in the length-wise direction of the board along the slit.

At least part of the layered member may be covered with a waterproof cover. A wiring member for audio signals may be provided outside or inside of the cover, with the cover having the layered member, and the wiring member, being stored in an exterior member.

An exterior member having the cover and the wiring member may have both end portions integrated with the connecting member and configured in a looped shape.

The connecting member may be a case-type member, with a double wall structural portion being partially formed on the outer wall thereof, and connecting means to a coated member of the strap or the electronic device being connected on the inner side of the connecting member through the double wall structural portion.

Case-type connecting members may be provided on one side and the other side of the strap respectively, with the input portion and the electronic device being connected to the one connecting member, a wiring member connected to the connecting means being stored inside of the strap, a connector for connecting the input portion and the connecting means being stored inside of the one case-type connecting member, and a terminal which is connected to the wiring member and is able to output signals for the electronic device being provided on the other case-type connecting member.

The input device may further comprise wireless communication means, which may be provided on the connecting member, detachably connected to an electronic device via the connecting portion. The input device may further comprise a coordinates input device connected to the connecting member, which comprises a planar operating panel, for coordinates input by sliding an indicating member over the operating panel.

Permission/prohibition for operation as to the input portion may be switched with an operating member provided on the connecting member.

According to a third aspect of the present invention, an input device has a spacer layer with one or more notched portions held between first and second flexible boards provided so as to face one another, and a flat region corresponding to the notched portion serves as an input portion of the input device, wherein each input portion comprises a gap defined by a notched portion of the spacer layer and the first and second boards, and contact members formed on the inner side of the first and second boards facing the gap.

According to a fourth aspect of the present invention, an input device has a flexible spacer layer held between first and second boards provided so as to face one another; wherein an input portion comprises a first electrode portion in a general planar striped shape formed between the first board and spacer layer, and a second electrode portion in a general planar striped shape formed on generally the same position as the first electrode portion in a plan view, in a direction intersecting the direction in which the first electrode extends.

With at least one of the input portions, contact members inside of the first board provided so as to face the gap may be formed of a resistor member, with a contact member of the second board being formed with a highly-conductive member, so that positional information within a planar region of the input portion can be output.

The input portion may be formed in a linear or belt shape, enabling positional information to be output along the direction in which the input portion extends.

With at least one of the input portions, all contact members of the first and second boards provided so as to face the gap may be formed of a highly-conductive material, so as to be capable of serving as a switch by bringing both contact members into contact.

The outer shape of the board may be a strip shape, with a connecting portion for connecting to an external electronic device being provided on end portion in the length-wise direction of the board.

The input device may further comprise wireless communication means, or wireless communication means may be provided on the connecting portion, detachably connected to an electronic device via the connecting portion. The input device may further comprise a coordinates input device connected to the connecting portion, which may include a planar operating panel, with coordinates input being performed by sliding an indicating member over the operating panel.

The input device may further comprise an operating member so as to hold the board, capable of sliding, directly or indirectly via a cover, over the board. The input device may be adhered onto or embedded into a part of clothing. The board may be adhered onto the outside of or embedded inside a band-shaped strap.

The strap may be hung around the neck, with the board mounted in the strap such that the strap is provided over the chest of a user in the event of hanging the strap around the neck.

An electronic device may include the input device.

According to the present invention as described above, the input device has an input portion applicable as operating means for an electronic device, for example, provided to a neck-hung or hand-held, belt-shaped strap, which realizes excellent operability and reduction in size as well. Moreover, the input device can be made fashionable more readily.

A small and light-weight input device can be obtained, and the trouble during carrying and operating can be reduced as well. Accordingly, an input device suitable for a portable electronic device can be provided.

Layering one pair of boards so as to slide the other end thereof freely in the length-wise direction allows layer slippage between the boards the event of folding the strap, so the mutual distance, and consequently the distance between the electrode layers or resistor layers, can be maintained at a constant level, and moreover, electrode layers or resistor layers of the input portion provided on the boards can be prevented from being subjected to local loads. Sliding the tip portion of the other board along a slit realizes a specific structure of layer slippage for the boards.

Forming both boards with outer shapes of a strip or a belt shape allows a band-shaped input device to be configured, which readily lends itself to fashion.

Covering a board with waterproofing covers protects the board comprising the input portion from moisture, and the problem of corrosion around input portions due to presence of moisture can be solved. Covering the end portion of an exterior member with a coated member and connecting to a connecting member with a coated member firmly fixes the junction between the exterior member and the connecting member, which cannot be readily pulled out.

A spacer layer with one or more notches is held between flexible first, and second boards facing one another, and a planar region corresponding to each notch serves as an input portion of the input device, with each input portion comprising a gap defined by with the notches of the spacer layer and the first and second boards, and a contact member formed on the inner side of the first and second boards faces the gap, so the input means can be readily incorporated as a part of the clothing of the user in the event of being applied as input means for a portable electronic device, for example, and readily lends itself to fashion.

One end of one pair of boards to be layered is integrated, and the other end of the boards is layered so as to slide freely in the length-wise direction, so in the event of folding the strap, the mutual distance between the resistor layers is maintained due to layer slippage between the boards, thereby preventing the resistor layers from being subjected to loads. Moreover, sliding the tip portion of the other board along a slit realizes a specific structure of layer slippage for the boards, and reduction in operability in the event of folding the strap can be suppressed.

Further features and advantages of the present invention will become more fully clear from the description of the preferred embodiments.

BRIEF DESCRIPTION OF THE DRAWINGS

FIGS. 7A and 7B is are diagrams illustrating a strap controller according to fourth and fifth embodiments of the present invention, wherein FIG. 7A illustrates a wrist-strap controller according to the fourth embodiment, and FIG. 7B illustrates a strip controller according to the fifth embodiment;

FIGS. 24A and 24B are diagrams illustrating a sixth embodiment of the strap controller according to the present invention, wherein FIG. 24A is a plan view, and FIG. 24B is a side view;

FIGS. 26A and 26B are local sectional views illustrating a connecting member of the sixth embodiment according to the present invention;

DESCRIPTION OF THE PREFERRED EMBODIMENTS

The following is a detailed description of embodiments according to the present invention, with reference to the drawings.

First Embodiment

Figure 1:
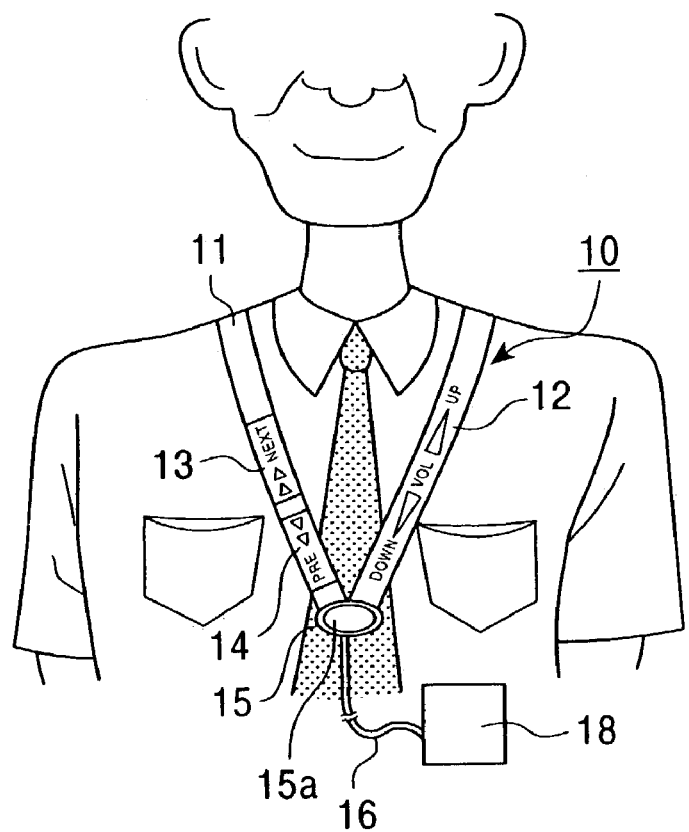
FIG. 1 is a diagram of a neck-hung strap controller according to a first embodiment of the present invention.

FIG. 1 shows the neck-hung strap controller (input device) according to a first embodiment of the present invention, wherein a strap controller 10 includes a band-shaped strap 11 shown in the drawing, a connecting member 15 connected to the strap 11 in a looped shape, and a connecting cord (connection means) 16 connected to the connecting member 15 and a portable audio device (portable electronic device) 18.

On the front side of the strap 11 (the front side in the event of hanging from the neck as shown in FIG. 1), input portions 12 through 14 are provided on both left and right sides of the connecting member 15. With the strap controller according to the present embodiment, playback volume of the portable audio device 18 can be adjusted with the input portion 12 provided on the right side in the drawing (the left chest side for the operator), and with the input portion 13 and 14 provided on the left side in the drawing (the right side for the operator), skipping (skip to the next tune) or back-skipping (return to the previous tune) can be performed respectively. Also, button switches 15a are provided on the front side of the connecting member 15, thereby playback/stop of the portable audio device 18 and permission/prohibition for operating the input portions 12 through 14 provided on the strap 11 can be performed by operating the button switches 15a.

Figure 2:
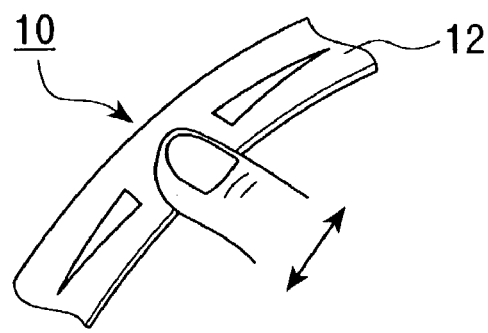
FIG. 2 is an explanatory diagram for describing operating instructions of an input portion of the strap controller shown in FIG. 1.

Description will be made regarding the input portion 12 which adjusts the playback volume of the portable audio device 18, with reference to FIGS. 2 through 4. FIG. 2 is an explanatory diagram which describes operating instructions of the input portion 12, FIG. 3 is a perspective configuration view which illustrates the input portion 12 in a disassembled view, and FIG. 4 is a cross-sectional structural diagram along the IV-IV line shown in FIG. 3.

Figure 3:
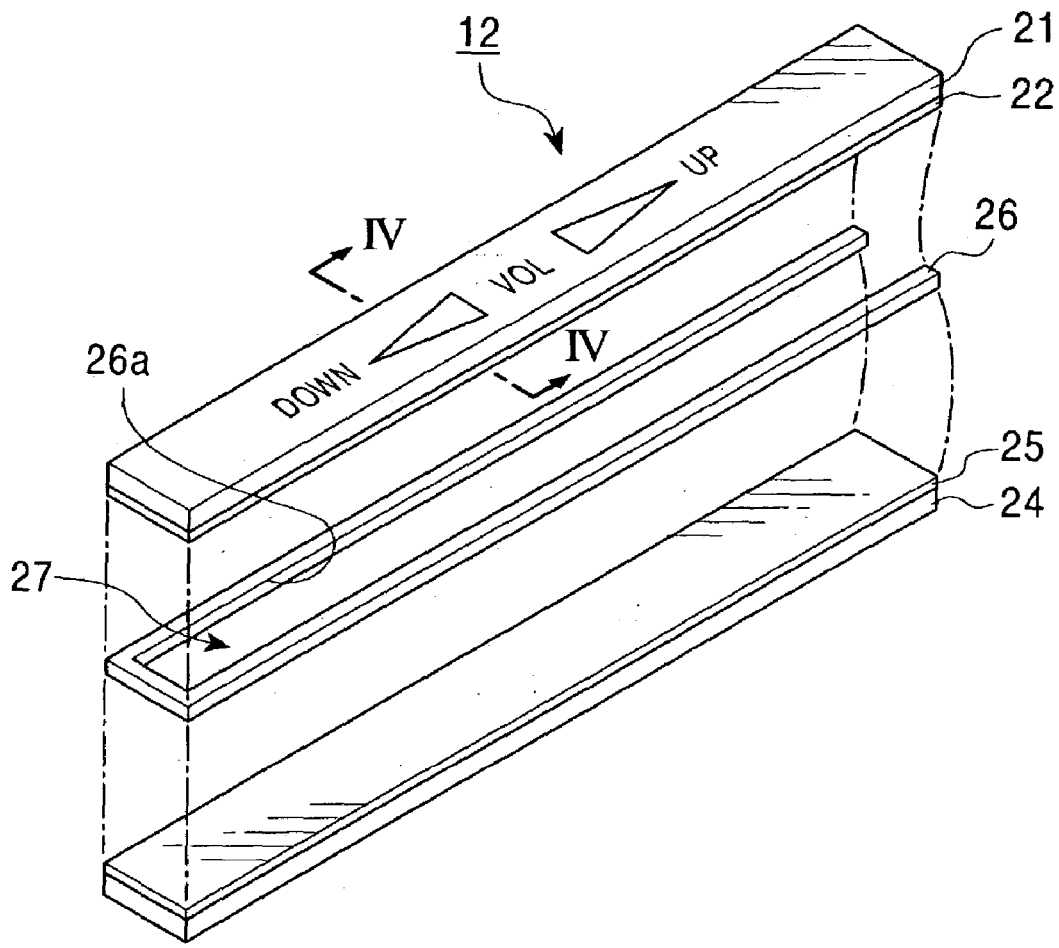
FIG. 3 is a disassembled perspective view of the input portion shown in FIG. 2.
Figure 4:
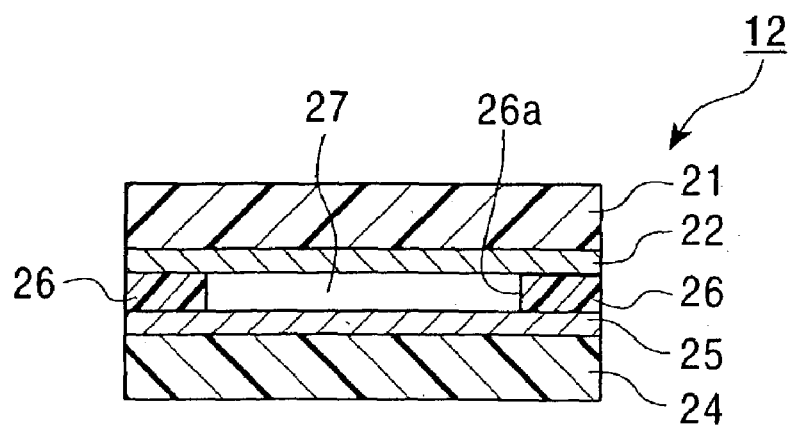
FIG. 4 is a cross-sectional structural view along line IV-IV shown in FIG. 3.

As shown in FIGS. 3 and 4, the input portion 12 has a configuration wherein a strip and sheet-shaped spacer layer 26 having a notched portion 26a therein is held between a first board 21 and second board 24. A space defined by the first board 21, the second board 24, and the notched portion of the spacer layer 26, forms a gap 27. A resistor layer (contact member) 22 made up of a resistive film is formed on the inner side of the first board 21 (spacer layer side) facing the gap 27, and an electric conductor layer (contact member) 25 made up of a highly-conductive film is formed on the inner side of the second board 24. That is to say, the strap 11 shown in FIG. 1 is configured by holding the spacer layer 26 and joining the boards 21 and 24. With the strap 11, the flat region corresponding to the notched portion 26a provided on the spacer layer 26 is the input portion 12.

On the outer side of the strap 11, characters and shapes are printed which show operating instructions for the input portion 12. These may be directly printed on the outer sides of the boards 21 and 24. In the event of providing cloth, resin, leather, or the like in order to cover the boards 21 and 24, the characters and shapes can be formed on the outer side of these members. Also, embroideries, engravings, printing or the like may be formed on these members.

The first board 21, the second board 24, and the spacer layer 26 can be configured with an insulating member having flexibility. For example, these may be configured with resin such as sheet-shaped PET (polyethylene terephthalate), polyimide, or the like.

Moreover, with the input portion 12, the resistor layer 22 includes a conductive film made up of such as carbon, ITO (indium tin oxide) or the like which causes electric field distribution in the event of voltage being applied thereto. The electric conductor layer 25 includes a highly-conductive member such as Al, Ag, Cu or the like.

In the event of operating the input portion 12 having the above-described configuration, as shown in FIG. 3 the boards 21 and 24 partially sag and the resistor layer 22 and the electric conductor layer 254 partially come into contact, by sliding fingers over the boards 21 and 24. In this state, voltage is applied to both ends of the resist or layer 22 so as to form electric field distribution in the direction in which the resistor layer 224 extends, so positional information in the lengthwise direction of the input portion 12 can be obtained, due to the electric potential extracted from the electric conductor layer 254 at the contact position, whereby moving directions and moving speed of the fingers sliding over the boards can be detected by continuously obtaining the positional information thereof. Accordingly, audio volume for playback of the portable audio device 18 can be adjusted based on the obtained positional information and moving directions.

Note that with the present embodiment, while description has been made with regard to a case wherein volume adjustment is performed with the input portion 12, it is needless to say that the input portion 12 may be assigned to operations requiring continuous input, such as adjustment of sound quality.

Next, the input portions 13 and 14 are configured with a cross-sectional structure similar to that of the input portion 12 as shown in FIG. 4. The spacer layer 26 having notched portion 26a is held between the first board 21 and the second board 24, and contact members are formed on the inner sides of each of the first and second boards. The input portions 13 and 14 are different from the input portion 12 in that each contact member formed on the inner sides of the boards 21 and 24 includes electric conductor layers made up of highly-conductive members. With the input portions 13 and 14 having such a configuration, the boards 21 and 24 sag and come into contact with the above-described electric conductor layer, so switching operation can be performed by pinching the boards 21 and 24 with the fingers. Accordingly, as shown in FIG. 1, in the event of pinching the input portion 13 with the fingers, skipping (skip to the next tune) operations can be performed, and in the event of pinching the input portion 14 with fingers, back-skipping (return to the previous tune) operation can be performed.

Note that, with the present embodiment, while description has been made with regard to a case wherein each contact member provided on the inner sides of the boards is configured of an electric conductor layer, the above-described operations can be made even in the event that the input portions 13 and 14 have a configuration similar to that of the input portion 12, and other functions may be assigned as to the operations of sliding fingers over the input portions 13 and 14. That is to say, skipping operations may be performed by pinching the input portion 13 with fingers, and a fast-forward operation may be performed by sliding fingers over the input portion 13.

Moreover, with the present embodiment, while description has been made with regard to connecting the connecting member 15 and the portable audio device 18 with the connecting cord 16, wireless and infrared connections without connection cables may be applied. In these cases, these connections can be readily realized by providing a module or device on the connecting member 15 for these connections, for example.

The strap controller 10 according to the present embodiment with the above-described configuration includes the input portions and push button switches for operating the portable audio device 18, and users can carry this controller as a neck-hung strap, so it can be said that this controller has excellent portability. Also, the input portions 12 through 14 and the button switches 15a are provided on the chest of a user, so the user can operate these in a natural state, whereby excellent operability can be obtained. For example, in the event of operating the input portions 12 through 14, the loop portion of the strap is hung around the neck, and operation such as volume control can be done by stroking downward an input portion with a finger, so the user can operate smoothly with one hand. Moreover, in the event of stroking an input portion upwards with a finger, operation can be done while holding a part of the strap.

Furthermore, various designs can be made on the strap 11, and accordingly, the strap has great potential fashion-wise.

With the above-described strap controller 10 according to the present embodiment, each input portion is configured with the common first board 21 and second board 24 comprising the input portions 12 through 14. However, the present invention is not restricted to this configuration, and an arrangement may be made wherein each of the input portions 12 through 14 is configured with an individual board and spacer layer, and the input portions 12 through 14 with such a configuration may be provided over or in the strap made up of cloth or bands, for example. With this configuration, the input portions 12 through 14 can be protected, thereby enabling a controller with high reliability to be provided.

Moreover, this configuration has an advantage in that operability does not readily deteriorate even in the event of downsizing the input portions 12 through 14. Furthermore, with this configuration, flexibility in designs of the strap is increased, thereby enabling a strap controller which readily lends itself to fashion designs, to be provided.

Also, with the strap controller 10 according to the present embodiment, while the button switches 15a for performing playback/stop of music and switching of permission/prohibition of operation for the input portions 12 through 14 have been provided on the connecting member 15, additional input portions having the functions of the button switches 15a may be provided on the strap 11, and in this case, input portions having similar configurations to that of 15 the input portions 13 and 14 may further be provided.

Second Embodiment

With the above-described first embodiment, description has been made with regard to a configuration wherein the strap controller 10 and the portable audio device 18 are connected via the connecting cord 16, the strap controller according to the present invention may be configured with a coordinates input device such as a tablet or the like, or wireless communication means.

Figure 5:
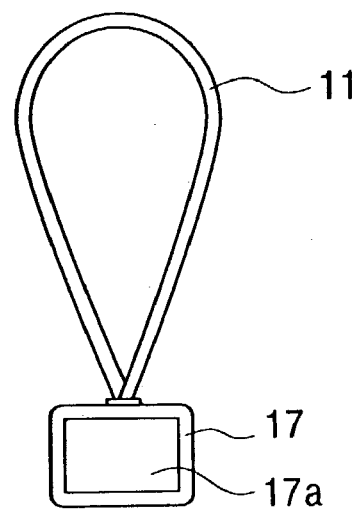
FIG. 5 is a diagram illustrating a strap controller according to a second embodiment of the present invention.

FIG. 5 is a diagram which illustrates a second embodiment of a strap controller (input device) according to the present invention, wherein the strap controller includes a coordinates input device 17 having wireless communication means therein, provided at the connecting portion of a strap 11 connected in a looped shape. The strap 11 shown in FIG. 5 has a similar configuration and performance equivalent to that shown in FIG. 1.

The coordinates input device 17 provided on the above-described strap controller includes an operating panel 17a in a flat shape, and is capable of input of two-dimensional coordinates information by sliding an indicator such as a finger thereupon. Examples include a contact or capacitance type tablet, though the coordinates input device 17 is not restricted in particular. With such a configuration, more complex operations than those of the strap controller 10 shown in FIG. 1 can be performed. For example, in the event of using the strap controller shown in FIG. 5 for operating a personal computer or the like, operations such as switching applications, feeding pages, and adjusting volume, are performed comfortably with the coordinates input device 17.

Moreover, the above-described coordinates input device 17 includes wireless communication means, so there is no need to be connected to the electronic device via a connecting cord as with the strap controller 10 shown in FIG. 1, and accordingly the trouble of operating and carrying the device is reduced, thereby enabling an input device with excellent usability to be obtained.

Third Embodiment

Figure 6:
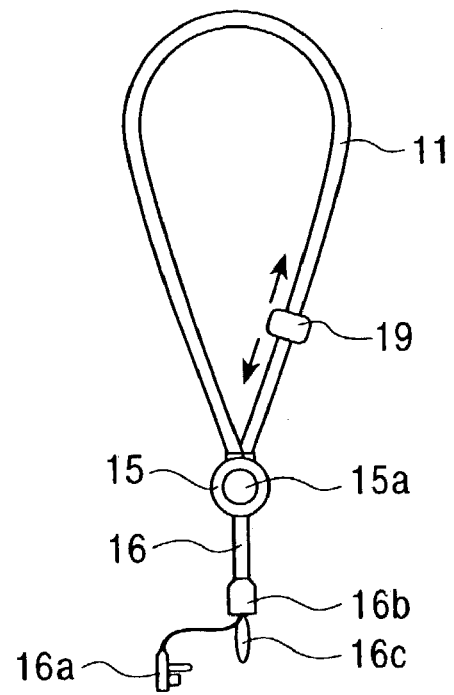
FIG. 6 is a diagram illustrating a strap controller according to a third embodiment of the present invention.

Next, FIG. 6 shows a third embodiment of a strap controller according to the present invention. The strap controller (input device) shown in FIG. 6 includes a strap 11 supported in a looped shape with a connecting member 15, a connecting cord 16 extended and provided from the connecting member 15, a retaining member 16b provided on the tip of the connecting cord 16, a connection plug 16a provided on the tip of the connecting cord 16 passing through the retaining member 16b, and a mounting string 16c supported in a looped shape by the retaining member 16b. Note that, of members shown in FIG. 6, the reference numerals the same as in FIG. 1 denote the same members shown in FIG. 1, so detailed description will be omitted here.

The strap controller shown in FIG. 6 holding the strap 11 includes an operating member 19 which is slidable on the strap 11. The operating member 19 serves as input assisting means for the strap controller, and increases stability during operating input portions provided on the strap 11.

That is to say, the strap 11 can be partially held by a constant pressure by pinching the member with fingers or the like and sliding the operating member 19 in the vertical direction in the drawing (the length-wise direction of the strap 11), whereby input operation as to the input portions provided on the strap 11 can be performed with the operating member 19. With the strap controller being operated as described above, pressing force (holding force) as to the strap 11 can be kept in a constant state, and accordingly, a handy strap controller, with which a user is less likely to make operational mistakes, can be realized.

Fourth and Fifth Embodiments.

Figure 7A:
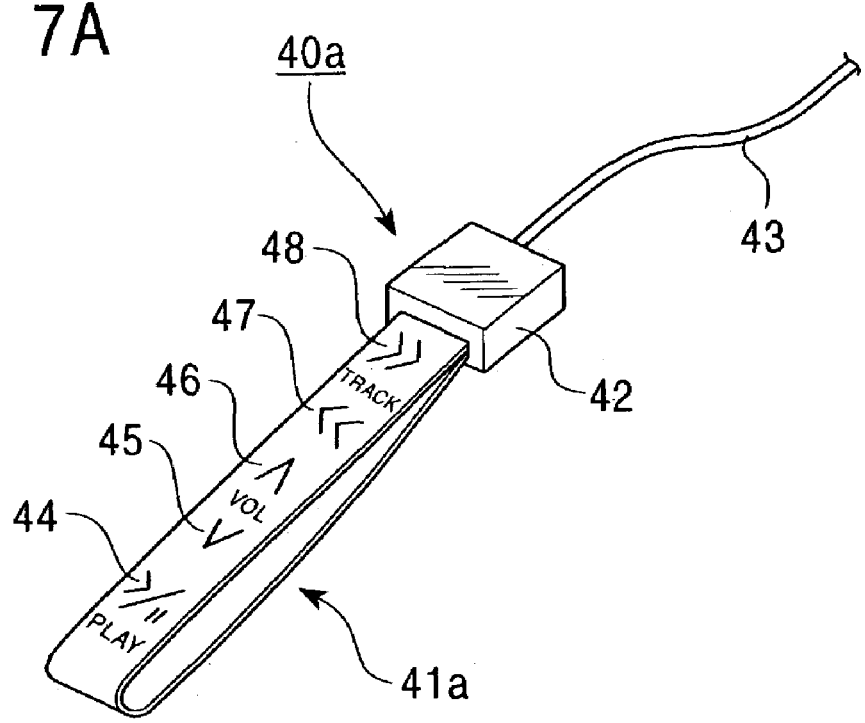
Figure 7B:
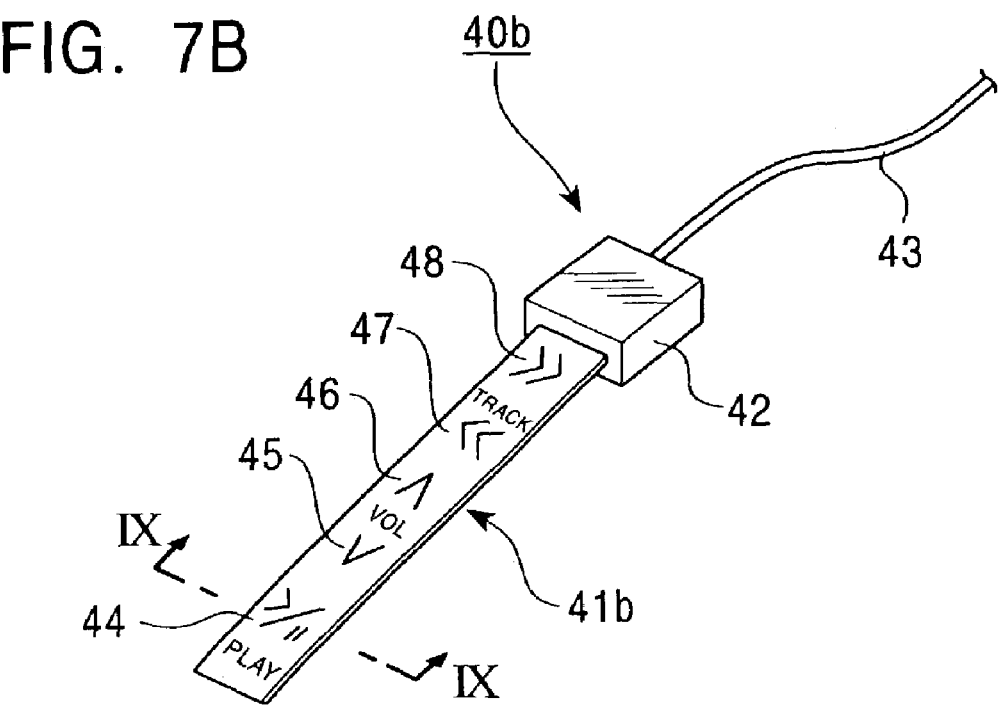

FIGS. 7A and 7B are perspective configuration diagrams of strap controllers of fourth and fifth embodiments according to the present invention. FIG. 7A illustrates the fourth embodiment wherein a wrist-type strap controller is employed, FIG. 7B illustrates the fifth embodiment wherein a strip-type strap controller is employed.

The wrist-type (hand-held type) strap controller (input device) 40a shown in FIG. 7A is configured with a connecting portion 42, a looped strap 41a whose both end portions are supported by one side of the connecting portion 42, and a connecting cord 43 connected to the opposed side of the side of the connecting portion 42 where the strap 41a is disposed. On the strap 41a, five input portions 44 through 48 are formed in array. With the controller shown in the drawing, functions such as playback/stop of music, volume adjustment, tracking (searching a tune) and the like are assigned to each input portion.

On the other hand, a strip-type strap controller 40b shown in FIG. 7B has a similar configuration to that of the wrist-type strap controller 40a shown in FIG. 7A except that the strap 41b has a strip shape, and input portions 44 through 48 are formed in array on the strap 41b. Note that the connecting member 42 shown in FIGS. 7A and 7B can embed a module for infrared connection or wireless connection to an electronic device. In this case, there is no need to provide the connecting cord 43.

Figure 8:
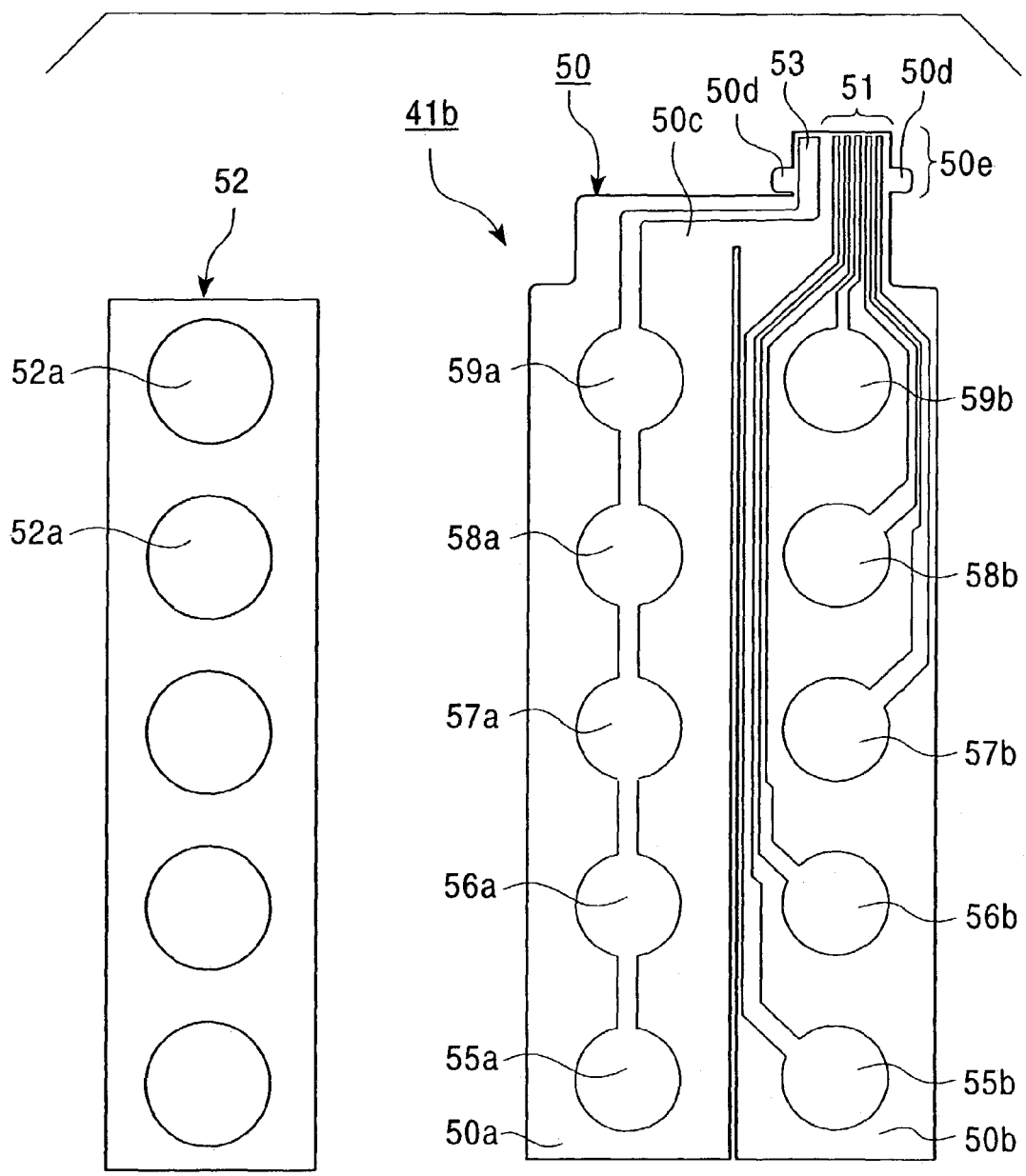
FIG. 8 is a disassembled view of the strap shown in FIG. 7B.
Figure 9:
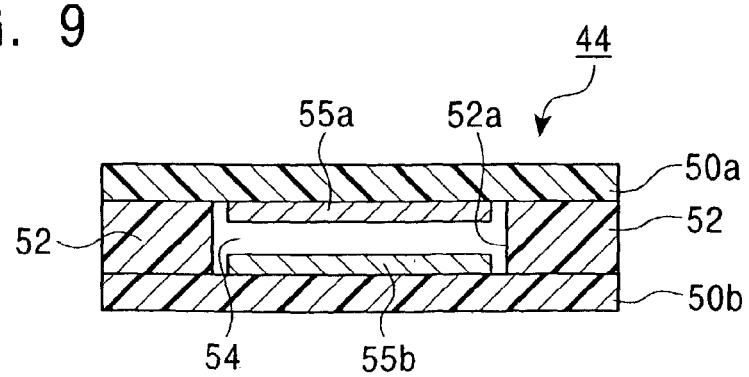
FIG. 9 is a cross-sectional structural view along line IX-IX shown in FIG. 7B.

FIG. 8 is a disassembled plan view which illustrates the inner structure of the strip-type strap controller shown in FIG. 7B, and FIG. 9 is a cross-sectional structural view along the IX-IX line shown in FIG. 7B.

As shown in FIG. 8, the strap 41b of the strip type controller 40b shown in FIG. 7B includes a board 50 made up of resin material such as PET or the like, and a spacer layer 52 made up of resin such as PET or the like shown in the left side of FIG. 8. The board 50 has a configuration wherein two board portions 50a and 50b forming the outer shape of the strap 41b are connected with a bridging portion 50c provided on their base portion side (side provided to the connecting member 42). These board portions 50a and 50b form the front and back sides of the strap 41b respectively, and the outer shape of the strap 41b is formed by folding the bridging portion 50c and overlaying the board portions 50a and 50b.

The spacer layer 52 is a planar quadrangular sheet-shaped member, and five circular notched portions 52a are formed in array as shown in FIG. 8. The strap 41b has a configuration wherein the bridging portion 50c is folded so as to overlay the board portions 50a and 50b, and the spacer layer 52 is held between the boards, which are integrated with fixing means such as adhesion or the like. Characters and shapes showing operating instructions of the input portions are printed on the outer side of the strap 41b here, but these may be directly printed on the outer side of the board portions 50a and 50b, or in the event that the board portions 50a and 50b are covered with cloth, resin, leather, or the like, characters and shapes may be provided on these members, and may be formed by embroidery on these members in some cases.

On the top side of the board 50a in the drawing (the side provided on the inner side in the event of being overlaid to the board portion 50b), generally circular electrodes (contact members) 55a through 59a made up of a highly-conductive material such as Ag, Al, or the like, are arrayed in a line, with the electrodes 55a and 59a being electrically connected with each other by wiring 53. One end of the wiring 53 is extended to the base portion side of the board portion 50a, the bridging portion 50c, and a terminal portion 50e provided on the base portion of the board portion 50b in this order. Also, on the top side of the board portion 50b shown in the drawing, generally circular electrodes (contact members) 55b through 59b are formed in a line. The electrodes 55b through 59b are formed at positions where each of the electrodes 55a through 59a is generally in the same respective position in a plan view in the event of overlaying the board portions 50a and 50b. Moreover, wiring 51 is connected to each of the electrodes 55b through 59b, and one end side of the wiring 51 is extended to the terminal portion 50e. Accordingly, with regard to the terminal portion 50e, the wiring 53 connected to the electrode of the board portion 50a side, and one end side of the five wiring lines 51 connected to the electrode of the board portion 50b side are provided thereto, and the wiring in a connecting cord 43 is connected thereto within the connecting member 42 shown in FIG. 7B. Also, retaining portions 50d and 50d made up of a protruding part of the board 50b are formed on both sides of the terminal portion 50e, and the strap 41b is retained to the connecting member 42.

The strap 41b is configured such that, in the state wherein the board 50 is folded at the bridging portion 50c, the spacer layer 52 is held between the board portions 50a and 50b, the five notched portions 52a of the spacer layer 52 are provided at the positions corresponding to each of the electrodes 55a through 59a, and the flat regions where the notched portions 52a are provided correspond to the input portions 44 through 48 respectively. For example, the input portion 44 has a configuration wherein the electrodes 55a and 55b are provided facing each other across a gap 54 defined by the inner side of the board portion 50a, the notched portion 52a, and the inner side of the board portion 50b, as shown in a cross-sectional structural view in FIG. 9. In the event of performing switching operation of the input portion 44, the inner sides of the board portions 50a and 50b are bowed so that the electrodes 55a and 55b come into contact one with another by pinching the outer sides of the board portions 50a and 50b thereof with fingers. Also, though omitted in the drawings, similar operations can be made with the input portions 45 through 48.

Note that, though the strip-type strap controller shown in FIG. 7B has been described with reference to FIGS. 8 and 9, the wrist-type strap controller 40a shown in FIG. 7A has a similar configuration to that shown in FIGS. 8 and 9; specifically, a board with a similar configuration to the board 50 but longer is prepared, the spacer is held thereby, following which the board is supported in a looped shape by the connecting member, thereby enabling the wrist-type strap controller to be provided.

Moreover, though in the above description, with regard to the board 50, the bridging portion 50c joins the board portions 50a and 50b made up of the same board, it is needless to say that different boards may be arranged as the board portions 50a and 50b, and the spacer layer 52 may be held there between such that the boards are joined.

The strip-type strap controller 40b having the above-described configuration serves as an operating portion of a portable audio device for example, and an input portion can perform switching operations and other assigned operations for the input portion by pinching the input portions 44 through 48 with the fingers. For example, in the event of operating the input portion 44, playback/stop operations of music for a portable audio device can be performed.

As described above, the strap controller according to the present embodiment has a wrist or strip shaped strap on which the input portions 44 through 48 are provided, so the strap controller suitably serves as an operating portion of a portable electronic device, and also is light in weight and is thinner as compared to conventional remote controllers, consequently, thereby facilitating downsizing, and operability does not deteriorate due to the downsizing. Moreover, the strap controller according to the present embodiment is a strap type, so flexibility in design is high, and readily lends itself to fashion designs.

It is needless to say that the strap controllers 40a and 40b according to the present embodiment shown in FIGS. 7A and 7B can serve as an operating remote controller for stationary electronic devices such as television sets, personal computers, or the like, as well as devices such as digital cameras, film cameras or the like, besides serving as a controller for portable electronic devices.

For example, the strap controller can serve as an operating remote controller for devices such as televisions, personal computers, cameras or the like, by storing an infrared transmitter or communication device in the connecting member 42 and operating these devices at the input portions provided on the strap. It is heedless to say that the strap controller can be widely applied to electric apparatuses and electronic devices which can be remote-controlled, besides televisions, personal computers and cameras.

The strap 41b making up the strip-type strap controller 4b according to the present embodiment is not restricted to the configuration shown in FIG. 8, and a wide variety of configurations can be assumed.

The following is a description of other configuration examples for a strap with reference to FIGS. 10 through 13.

Figure 10:
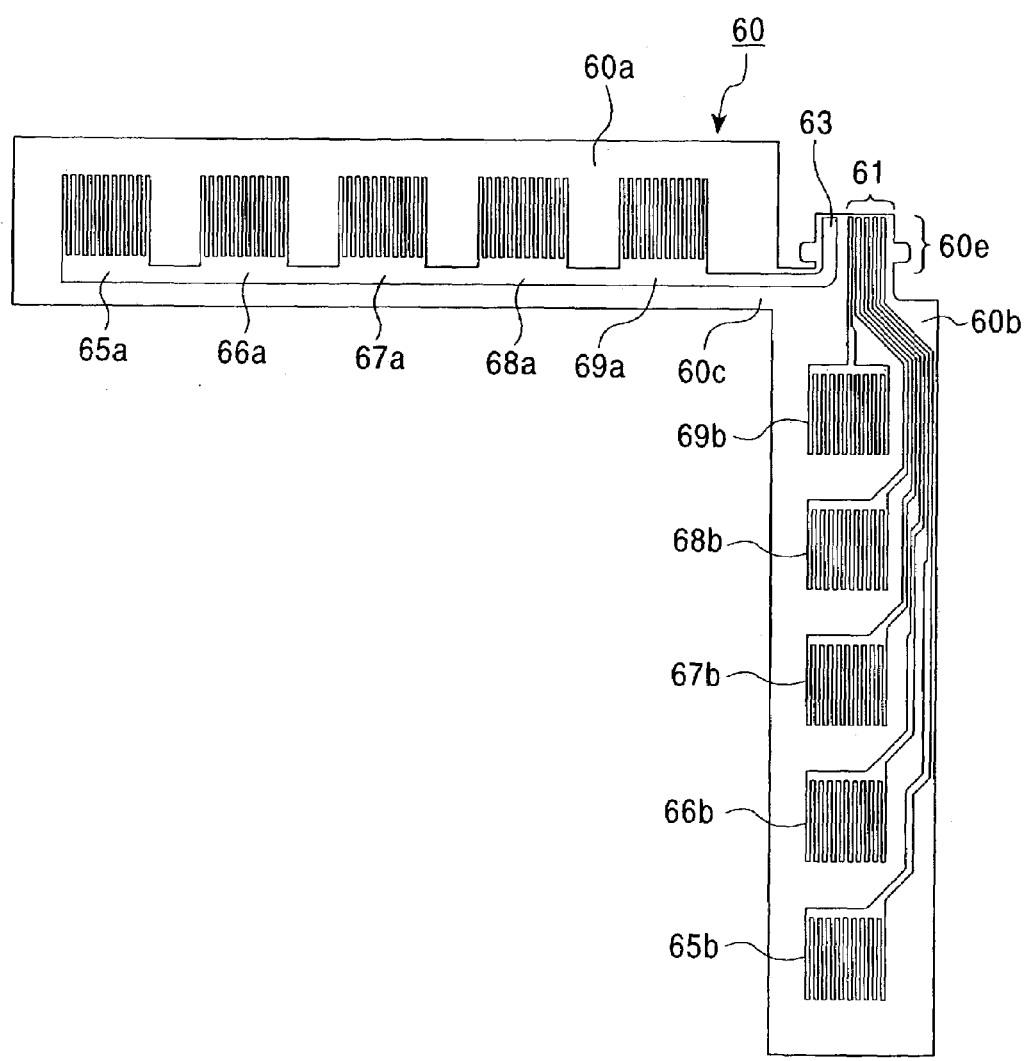
FIG. 10 is a plan view of a board applicable to the strap controller shown in FIG. 7B.

FIG. 10 is a plan configuration diagram of a board 60 capable of configuring the strap 41b shown in FIG. 7B. The board 60 shown in this drawing has a configuration wherein board portions 60a and 60b provided in a planar L-shape are connected at a base portion 60c. On the top side of the board portion 60a shown in the drawing, five electrodes 65a through 69a are arrayed, which are electrically connected with wiring 63 of which one end side passes through the base portion 60c and extends to a terminal portion 60e provided on the base portion side of the board portion 60b. On the other hand, on the top side of the board portion 60b shown in the drawing, the five electrodes 65b through 69b are arrayed. Wiring 51 is extracted from each of the electrodes, and one end side of the five wiring lines 61 extends to the terminal portion 60e. Also, each of electrodes 65a through 69a and 65b through 69b has a configuration wherein multiple electrode lines formed in a planar striped shape are electrically connected at an end portion thereof one to another. In order to configure the strap 41b shown in FIG. 7B with the board 60 shown in FIG. 10, the board 60 is folded at the base portion 60c so as to overlay the base portions 60a and 60b at generally the same position as viewed from above. At this time, a flexible insulation sheet such as a PET sheet serving as a spacer is held between the board portions 60a and 60b so that the electrodes 65a through 69a and electrodes 65b through 69b provided so as to face each other are electrically insulated. With the strap having the above-described configuration, the electrodes 65a and 65b are at generally the same position in a plan view, and a striped shape electrode line of the electrode 65a and a striped shape electrode line of the electrode 65b are provided orthogonal to each other in a plan view. Moreover, the electrodes 66a through 69a and the electrodes 66b through 69b are similarly provided. Thus, the planar regions of the electrodes 65a through 69a form the input portions 44 through 48 on the strap 41b.

With the strap controller including the strap 41b configured with the board 60, switching operations are performed only by approaching or contacting the input portions with fingers, instead of by bowing the board portions of the input portions as with the controller including the board 50 shown in FIG. 8. For example, with regard to the input portions configured with the electrodes 65a and 65b, upon applying voltage onto the electrodes 65a and 65b provided so as to face each other, an electric field is generated between the electrodes 65a and 65b. In the event of fingers or the like approaching the electrodes 65a and 65b kept in such a state, the state of the electric field formed between the electrodes changes, thereby enabling a signal corresponding to the voltage variation to be extracted from the terminal 60e. Thus, switching operations can be performed based on this extracted signal.

Note that, while description has been made above regarding an arrangement wherein the electrodes 65a through 69a and 65b through 69b are provided with the board portions 60a and 60b being overlaid, overlaying the board portions 60a and 60b so that the electrodes 65a through 69a and 65b through 69b face outward does away with the need to insert a spacer between the board portions 60a and 60b.

In FIG. 10 illustrates an arrangement where the board has a configuration wherein the board portions 60a and 60b are connected at the base portion 60c, but it is needless to say that the board portions 60a and 60b may be separated boards. In this case, a strap controller can be configured having functions equivalent to those of the strap controller configured with the board 60 as described above, by connecting both board portions so that the sides wherein the electrodes are formed do not face each other.

Figure 11:
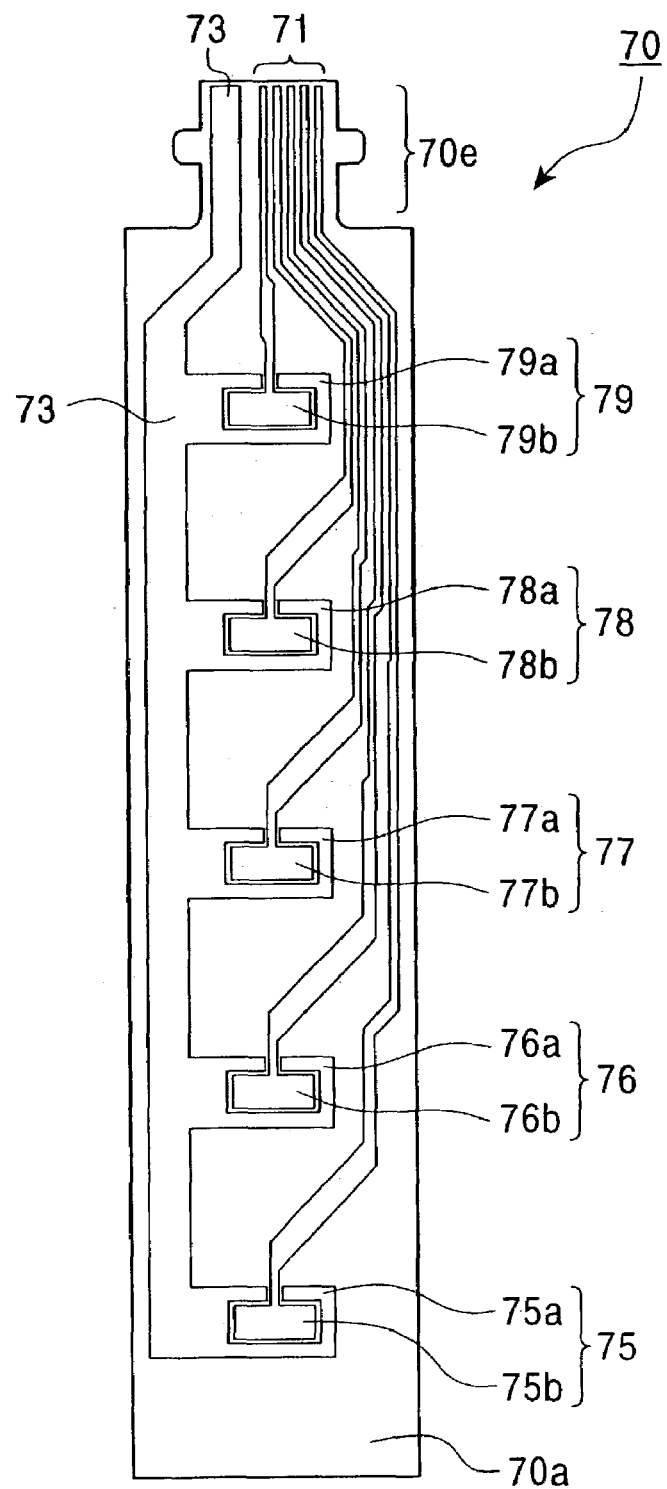
FIG. 11 is a plan view of a board applicable to the strap controller shown in FIG. 7B.
Figure 12:
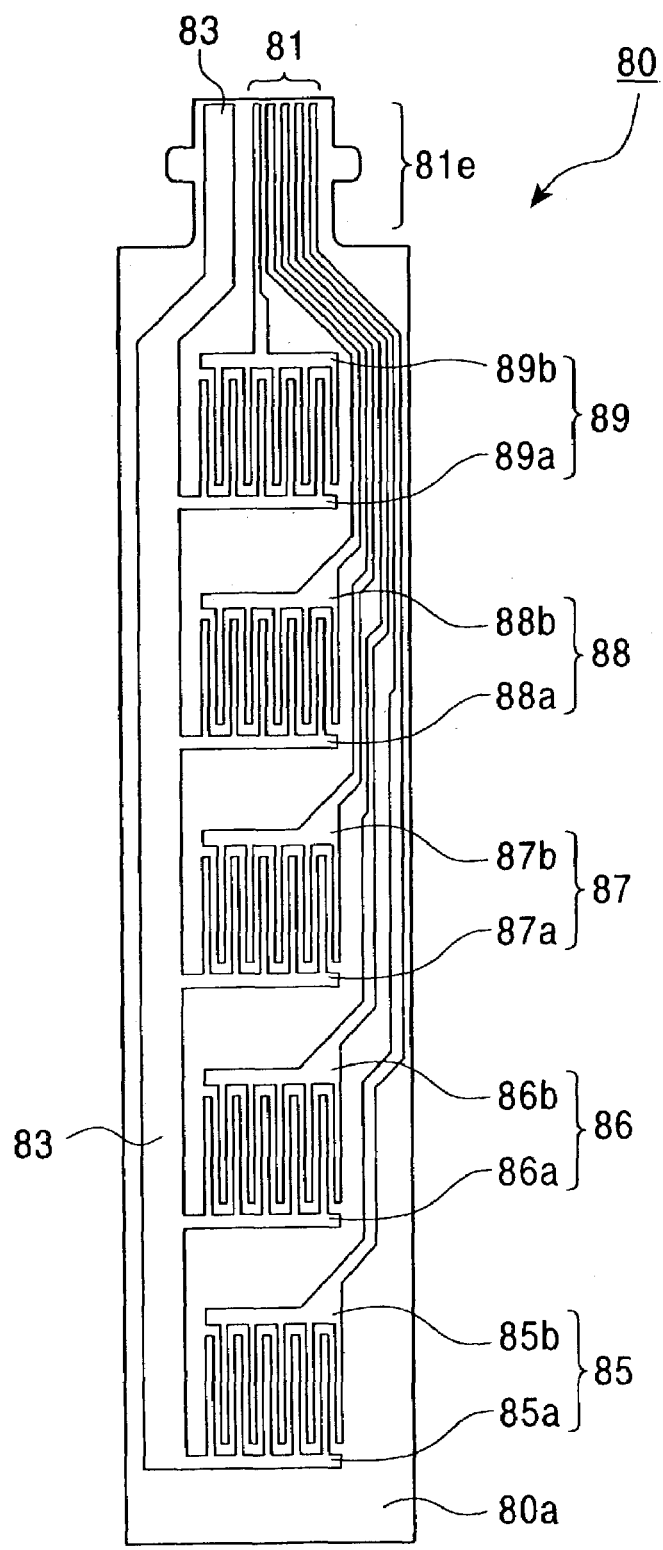
FIG. 12 is a plan view of a board applicable to the strap controller shown in FIG. 7B.

FIGS. 11 and 12 are plan views of boards 70 and 80 for configuring a strap controller with capacitance type input portions, for configuring the strap 41b, as with the case of the board 60 shown in FIG. 10. The board 70 shown in FIG. 11 includes a board portion 70a having a general strip shape and a terminal portion 70e formed on one side of the board portion 70a in the length-wise direction thereof. On the top side of the board portion 70a in the drawing, five electrode portions 75 through 79 are arrayed, with the regions on the board portion 70a which correspond to the electrode portions 75 through 79 each corresponding to the input portions 44 through 48 shown in FIG. 7B. The electrode portion 75 is configured with an electrode 75b in a general planar rectangular shape and an electrode 75a in a general planar picture-frame shape formed so as to surround the electrode 75b. The electrodes 75a and 75b are separated by a narrow gap. Also, the electrode portions 76 through 79 have the same configuration as the electrode portion 75. The electrodes 75a through 79a are electrically connected each other with wiring 73, and one end side of the wiring 73 extends to a terminal portion 70e. Moreover, wiring 71 is extracted from each of the electrodes 75b through 79b, and the other end side of the wiring 71 extends to the terminal portion 70e. In the event of configuring the strap 41b shown in FIG. 7B with the board 70, an insulation protective sheet such as a PET sheet is applied to the side on which electrode portions of the board 70 are formed.

The strap controller comprising the strap 41b formed with the above-described board 70 can perform switching operations of the input portions by approaching and contacting the input portions 44 through 48 with fingers, the same as the strap controller comprising the board 60 shown in FIG. 10.

The board 80 shown in FIG. 12 includes a board portion 80a in a strip shape and a terminal portion 80e formed one end side of the board portion 80a in the length-wise direction of the board portion 80a. On the top side of the board portion 80a in the drawing, five electrode portions 85 through 89 are arrayed, with the regions on the board portion 80a which correspond to the electrode portions 85 through 89 each corresponding to the input portions 44 through 48 shown in FIG. 7B. The electrode portion 85 is configured with an electrode 85a in a general planar toothcomb shape, and an electrode 85b in a general planar toothcomb shape, formed so as to engage each other alternately. The electrodes 85a and 85b are separated by a narrow gap. Also, the electrode portions 86 through 89 have the same configuration as that of the electrode portion 85. The electrodes 85a through 89a are electrically connected each other by wiring 83, and one end side of the wiring 83 extends to a terminal portion 80e. Moreover, wiring 81 is extracted from each of the electrodes 85b through 89b, and the other end side of the wiring 81 extends to the terminal portion 80e. In the event of configuring the strap 41b shown in FIG. 7B with the board 80, a insulation protective sheet such as a PET sheet is applied to the side on which electrode portions of the board 80 are formed.

The strap controller including the strap 41b formed with the above-described board 80 can perform switching operations of the input portions by approaching and contacting the input portions 44 through 48 with the fingers, the same as with the strap controller including the board 60 shown in FIG. 10.

Figure 13:
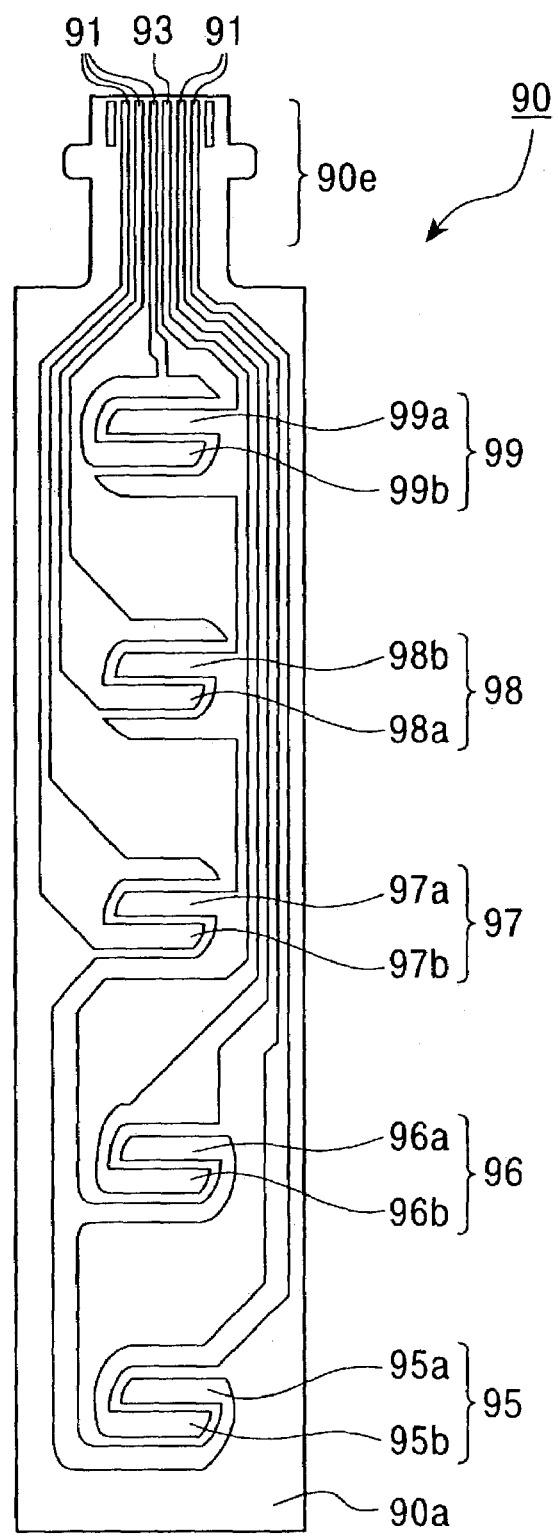
FIG. 13 is a plan view of a board applicable to the strap controller shown in FIG. 7B.

FIG. 13 is a plan view of a board 90 applicable to the strap 41b, as with the board 60 shown in FIG. 10. The board 90 shown in this drawing includes a board portion 90a in a general strip shape and a terminal portion 90e formed on one side of the board portion 90a in the length-wise direction of the board portion 90a. On the top side of the board portion 90a in the drawing, five electrode portions 95 through 99 are arrayed, with the regions on the board portion 90a which correspond to the electrode portions 95 through 99 each corresponding to the input portions 44 through 48 shown in FIG. 7B. The electrode portion 95 is configured with an electrode 95a in a general planar horseshoe shape and an electrode 95b shaped so as to engage the opening end side of the electrode 95a with that of the electrode 95b. Also, the electrode portions 96 through 99 have the same configuration as the electrode portion 95. The electrodes 95a is electrically connected with wiring 93 provided on the board portion 90a, and one end side of the wiring 93 extends to a terminal portion 90e. Moreover, wiring 91 is extracted from each of the electrodes 95b through 99b, and the other end side of the wiring 91 extends to the terminal portion 90e. In the event of configuring the strap 41b shown in FIG. 7B with the board 90, a spacer made of a PET sheet or the like and a protective sheet are layered onto the side on which the electrode portions of the board 90 are formed. With regard to the spacer, notched portions are opened at the positions of the spacer corresponding to the electrode portions 95 through 99. With regard to the protective sheet, conductive contact points made up of metal thin film or the like are provided at the positions facing the electrode portions 95 through 99 inner side of the protective sheet. With the strap 41b having the above-described configuration, the protective sheet or the board portion 90a is partially bowed by pinching the input portion 44 with fingers for example, and accordingly, the contact points of inner side of the protective sheet come into contact with the electrode portion 95 so that the electrodes 95a and 95b are electrically connected via the contact points, whereby the input portion 44 can perform switching operations, and switching operations can be performed in the same manner as described above with regard to the input portions 45 through 48.

(Application Examples of Input Device)

Next, application examples of the input device according to the present invention will be described below with reference to FIGS. 14A through 17.

Figure 14A:
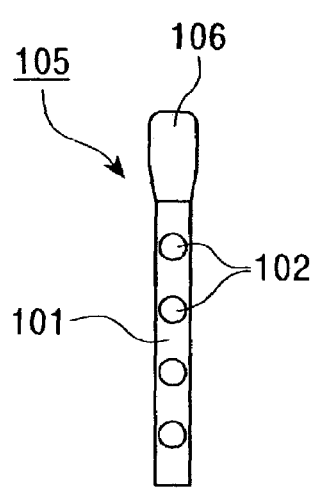
FIGS. 14A and 14B are diagrams illustrating an application example of the input device according to the present invention.
Figure 14B:
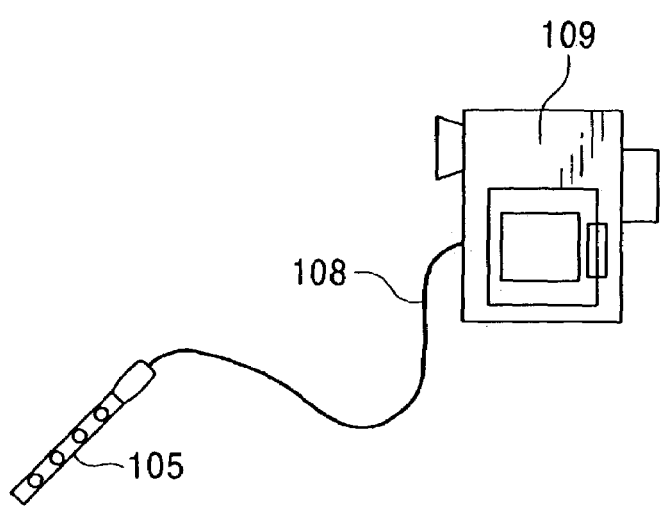

FIG. 14A is a configuration diagram which illustrates a remote control device, one example of the input device according to the present invention. FIG. 14B is a configuration diagram which illustrates a video camera, one example of an electronic device including a remote control device according to the present invention. The remote control device 105 shown in FIG. 14A includes a main unit 101, multiple input units 102 provided on the main unit 101, and a connection unit 106 provided on one end side of the main unit 101 in the length-wise direction thereof. With the remote control device according to the present invention, the input unit 102 has a configuration the same as the input portions 44 through 48 shown in FIGS. 7A and 7B, and the main unit 101 is configured with a flexible board. Also, wireless communication means not shown in the drawing are provided to the connecting unit 106, so in addition to the arrangement wherein the connecting unit 106 is connected to a video camera 109 via a connecting cord 108 shown in FIG. 14B, the video camera 109 can be operated with the wireless communication means. With this configuration, a handy remote control device, which is thin and small in size as compared to conventional devices, and also handy for operating electronic devices due to wireless connection therewith, can be provided.

Figure 15:
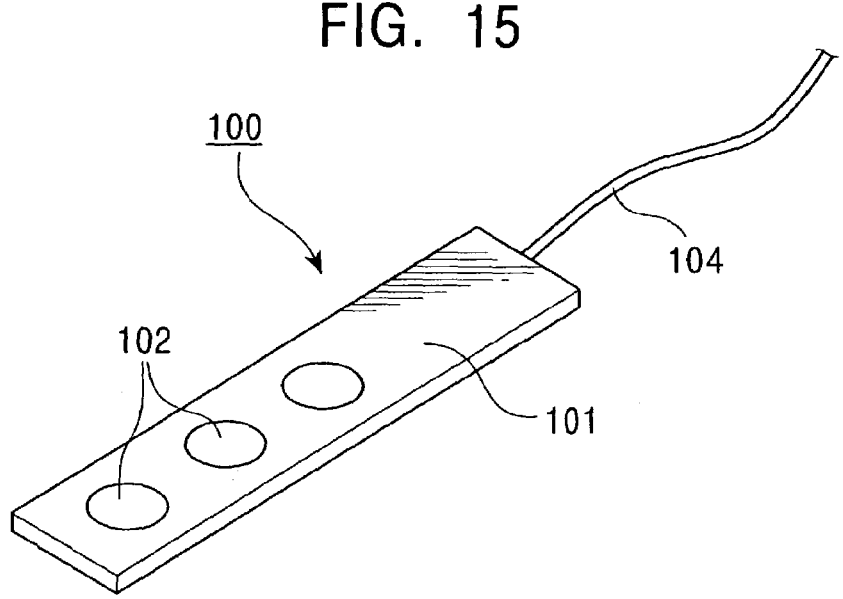
FIG. 15 is a diagram illustrating an application example of the input device according to the present invention.

FIG. 15 is a perspective configuration diagram of a remote control device, one example of an input device according to the present invention, wherein a remote control device 100 includes a main unit 101, multiple input units 102 provided on the main unit 101, and a connecting cord 104 connected to one side of the main unit 101. With the above-described remote control device, the input unit 102 has the same configuration as the input portions 44 through 48 shown in FIGS. 7A and 7B, and the main unit 101 is configured with a flexible board. With such a configuration, a thin and light-weight remote control device can be provided.

Figure 16:
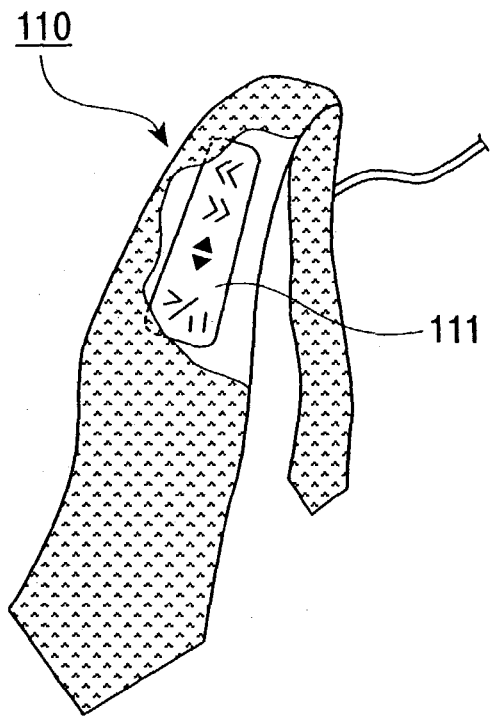
FIG. 16 is a diagram illustrating an application example of the input device according to the present invention.

FIG. 16 is a perspective configuration diagram which illustrates an example wherein the input device having the same configuration as the strap 41b of the strap controller 40b shown in FIG. 7B is embedded in a tie. With a tie 110 shown in the drawing, an input device 111 according to the present invention is built in, so operation of a portable electronic device can be performed while wearing the tie 110, thereby enabling input devices which are fashionable and highly operable, to be provided.

Figure 17:
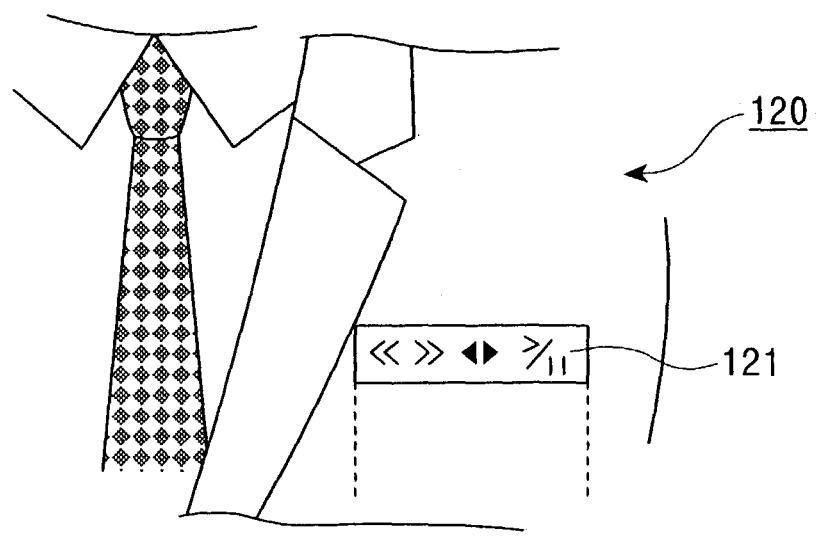
FIG. 17 is a diagram illustrating an application example of the input device according to the present invention.

FIG. 17 is a perspective configuration diagram which illustrates an example wherein the input device having the same configuration as the strap 41b of the strap controller 40b shown in FIG. 7B is embedded in a breast pocket of a suit. With a suit 120 shown in the drawing, an input device 121 according to the present invention is built in, so operation of a portable electronic device can be performed while wearing the suit 120, thereby enabling input devices which are fashionable and highly operable, to be provided.

(Electronic Devices)

FIGS. 18 through 23 are diagrams which illustrate electronic devices including the input device according to the present invention.

Figure 18:
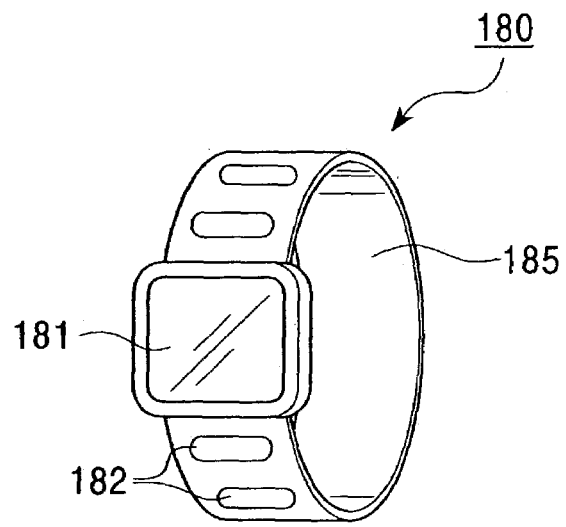
FIG. 18 is a diagram illustrating a configuration example of the electronic device according to the present invention.

FIG. 18 is a diagram which illustrates an example wherein the strap controller according to the present embodiment as described above is employed as a strap (wristwatch band) of a wristwatch (or wristwatch type computer). A wristwatch 180 shown in the drawing includes a watch main unit 181 and a strap (wristwatch band) 185, and multiple input portions 182 are provided on the outer side of the strap 185. With this configuration, a wristwatch type is employed which is very portable and easy to use, and operation of other electronic devices is facilitated.

Figure 19:
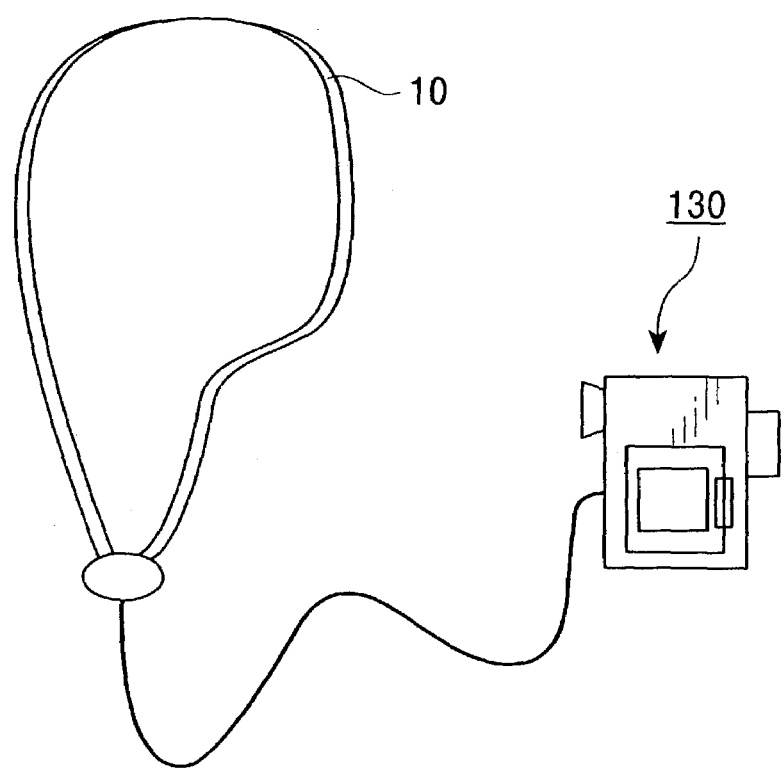
FIG. 19 is a diagram illustrating a configuration example of the electronic device according to the present invention.

FIG. 19 is a diagram which illustrates a video camera having the neck-hung strap controller 10 according to the present embodiment as described above. The video camera 130 shown in the drawing can be easily operated with the strap controller 10 according to the present invention, which also readily lends itself to fashion designs.

Figure 20:
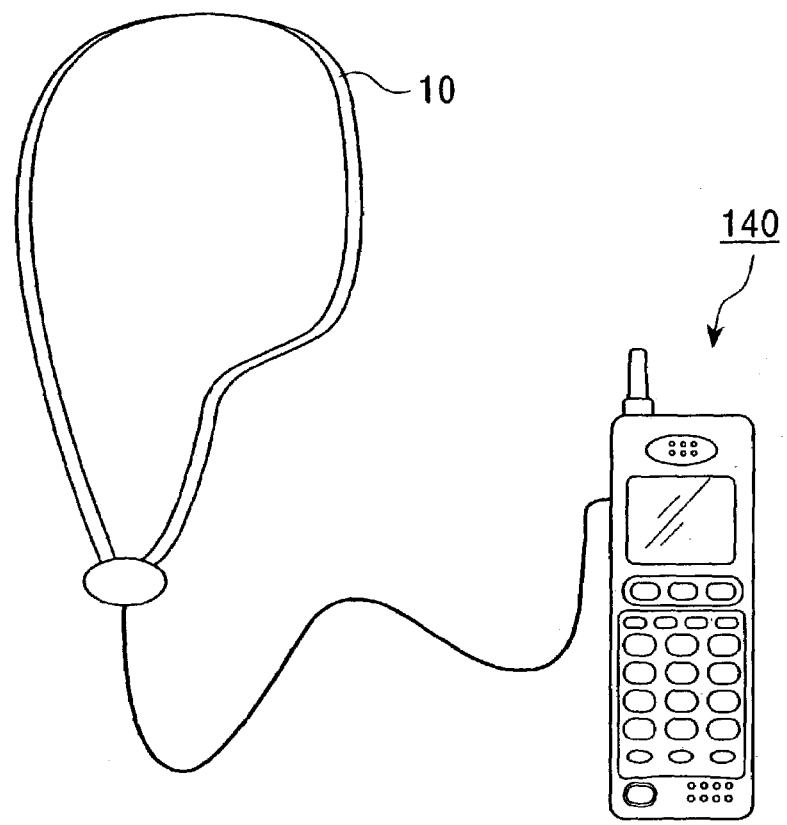
FIG. 20 is a diagram illustrating a configuration example of the electronic device according to the present invention.

FIG. 20 is a drawing which illustrates a cellular phone having the neck-hung strap controller 10 according to the present embodiment as described above. The cellular phone 140 shown in the drawing can be operated comfortably with the strap controller 10 according to the present invention, which also readily lends itself to fashion designs. Furthermore, hand-free talk can be performed with a strap controller 10 including earphones and a microphone, thereby increasing operability and performance.

Figure 21:
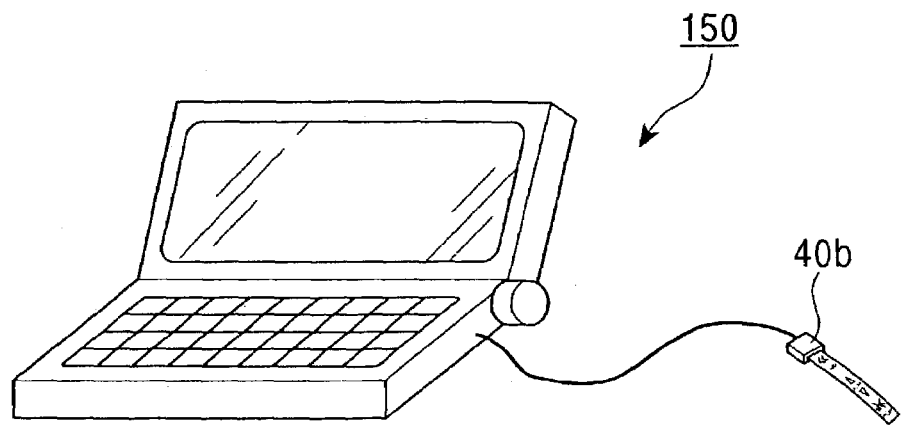
FIG. 21 is a diagram illustrating a configuration example of the, electronic device according to the present invention.

FIG. 21 is a diagram which illustrates a laptop personal computer having the strip-type strap controller 40b according to the present embodiment as described above. The laptop personal computer 150 shown in the drawing can be easily operated with the strip-type strap controller 40b according to the present invention, which also readily lends itself to fashion designs.

Figure 22:
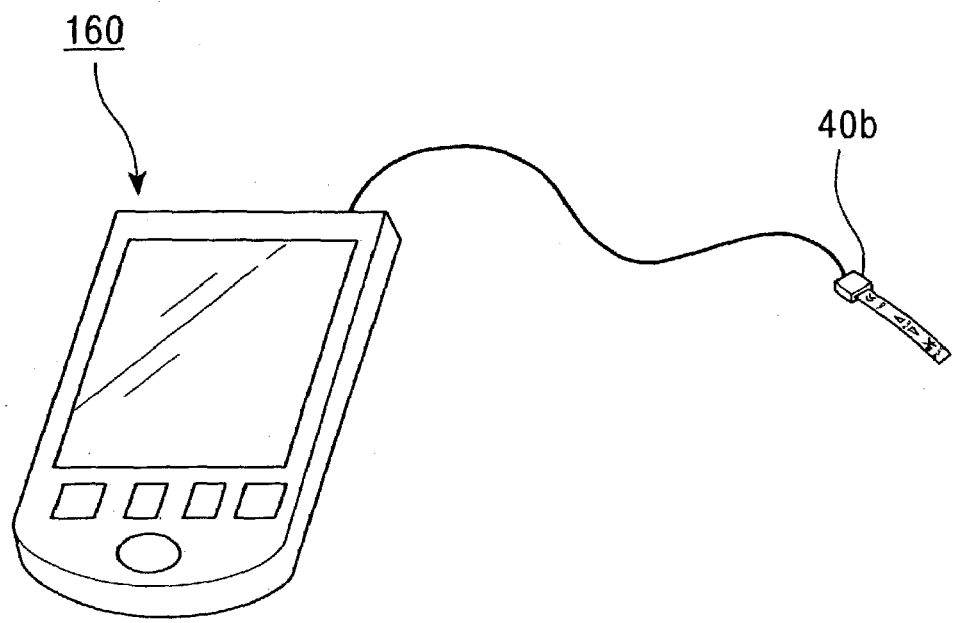
FIG. 22 is a diagram illustrating a configuration example of the electronic device according to the present invention.

FIG. 22 is a diagram which illustrates a hand-held information terminal having the strip-type strap controller 40b according to the present embodiment as described above. The hand-held information terminal 160 shown in the drawing can be easily operated with the strip-type strap controller 40b according to the present invention, which also readily lends itself to fashion designs.

Figure 23:
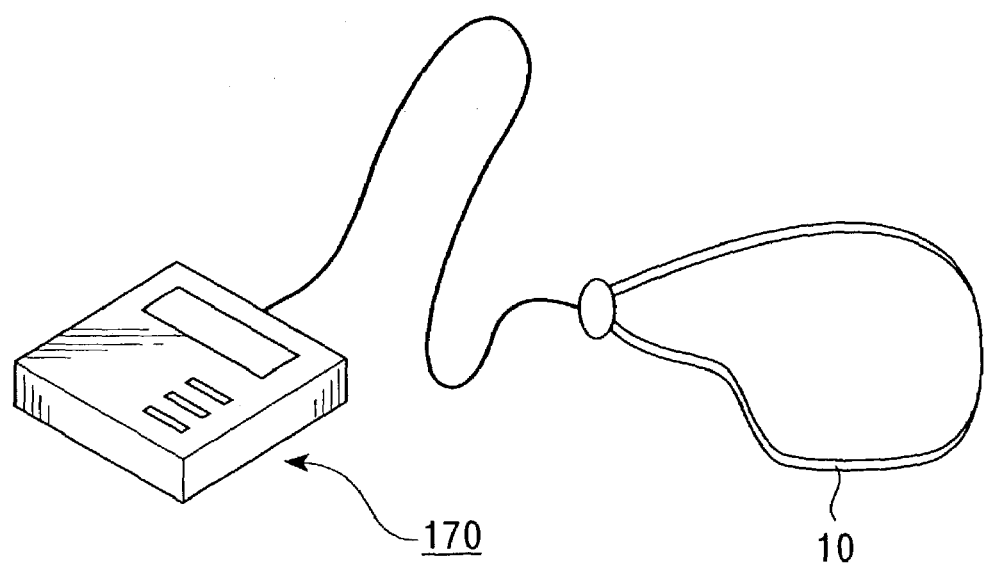
FIG. 23 is a diagram illustrating a configuration example of the electronic device according to the present invention.
Figure 24A:
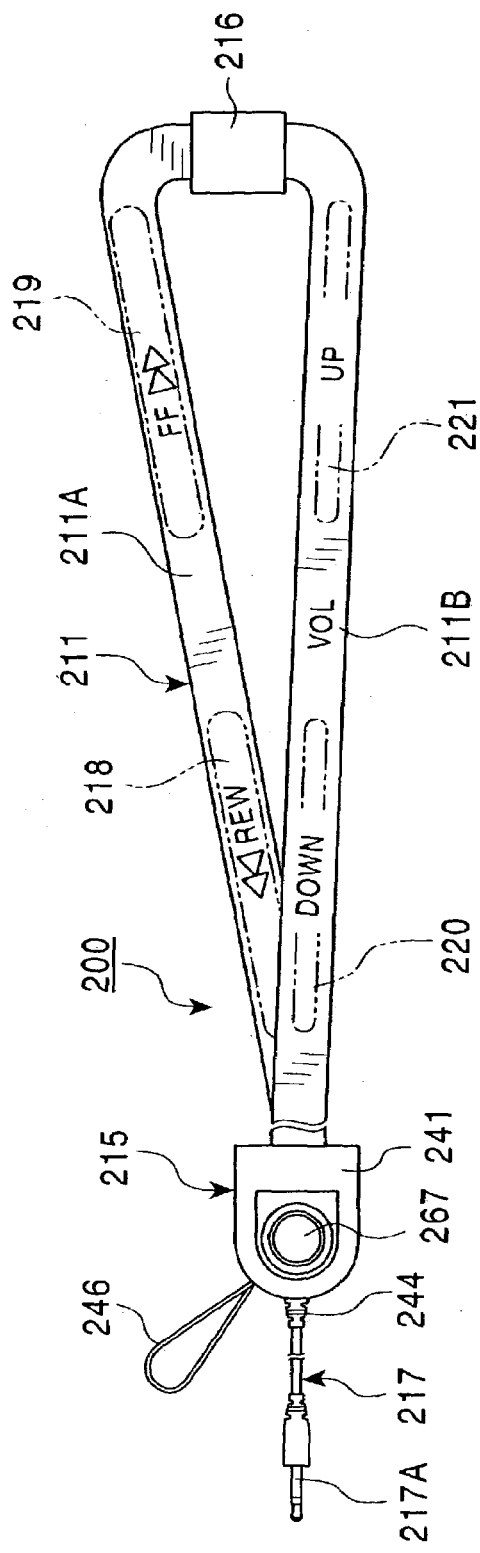
Figure 24B:
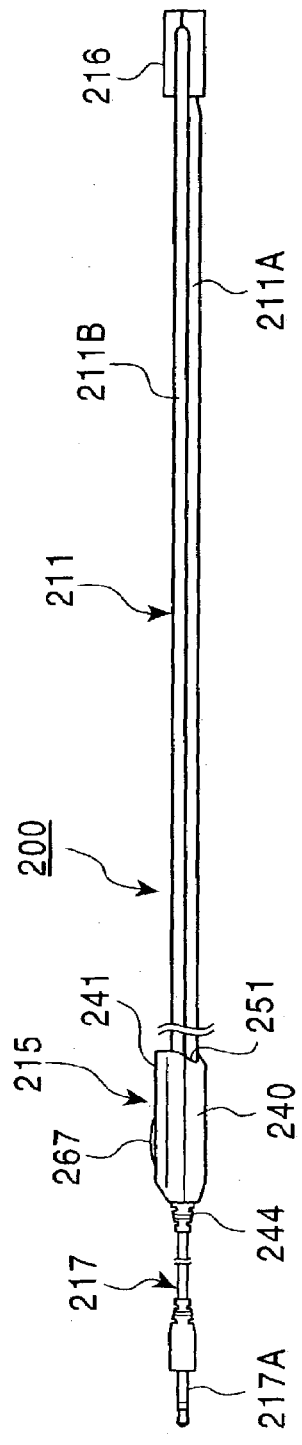
Figure 25:
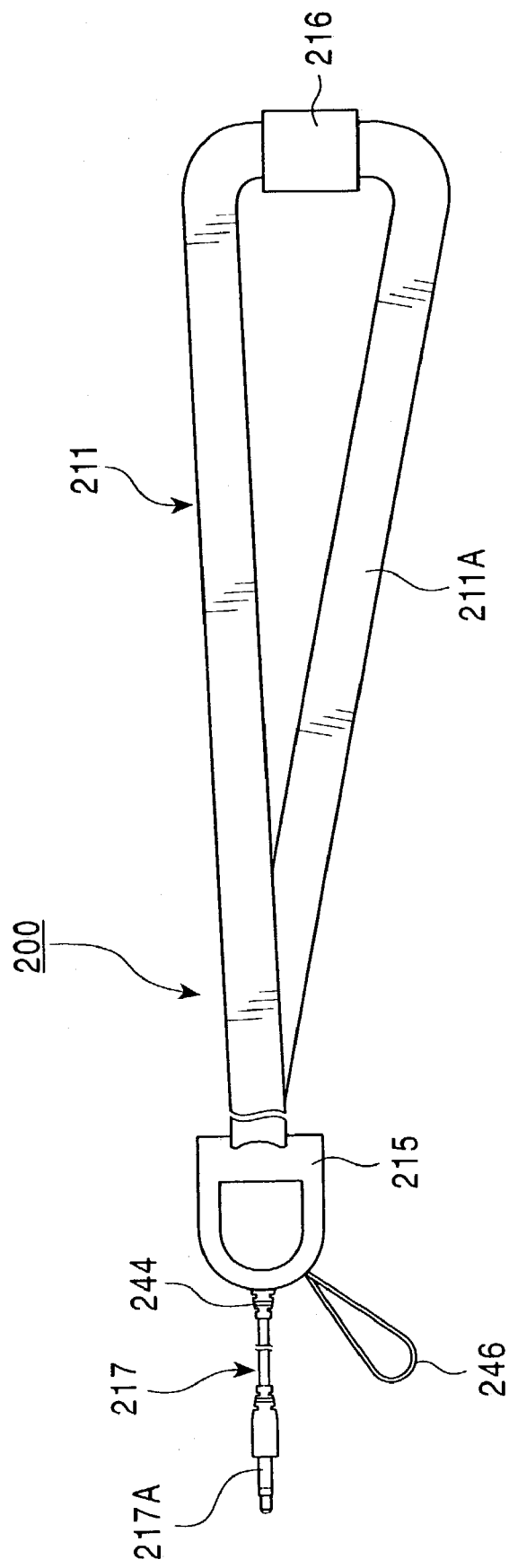
FIG. 25 is a bottom view illustrating a sixth embodiment according to the present invention.

FIG. 23 is a drawing which illustrates a mini-disk player having the neck-hung strap controller 10 according to the present embodiment as described above. The mini-disk player 170 shown in the drawing can be easily operated with the strap controller 10 according to the present invention, which also readily lends itself to fashion designs.

Now, neck-hung, hand-held, and wristband type strap controllers have been described, by the present invention is not restricted to this, and other various types such as a wrapover-type straps for handbags other types of bags, shoulder straps, boots straps, or the like, are included in the present invention.

Sixth Embodiment

FIGS. 24 through 33 show a sixth embodiment of the strap controller according to the present invention. The strap controller (input device) 200 according the present embodiment includes a strap 211 overlaid in a general V-shape with a neck-hung band, a first connecting member 215 and second connecting member 216 connected to the strap 211 in a looped shape, and a connecting cord (connecting means) 217 for connecting the first connecting member 215 and a portable audio device (portable electronic device) not shown in the drawing. In this configuration, a terminal plug (mini plug) 217A for connecting to such a portable audio device 18 shown in FIG. 1 for example is provided on the tip of the connecting cord 217.

With the strap controller 200 according to the present sixth embodiment, the strap 211 has a configuration wherein the first connecting member 215 provided on one end side thereof, and the second connecting member 216 provided on the other end side thereof, are connected so as to connect two strap bodies 211A and 211B in a loop, with one pair of switching members (input portions) 218 and 219 being embedded in the strap body 211A and one pair of slidable switching members (input portions) 220 and 221 being embedded in the strap body 211B.

Membranes 223 formed in a flexible sheet shape made up of a PET film or the like, are stored in a folded state within the strap bodies 211A and 211B, as described later. The membrane 223 has a configuration wherein first through fourth boards, 223a, 223b, 223c and 223d formed in a strip shape as shown in FIG. 26A, are provided in parallel with some distance, moreover, each of four boards 223a through 223d of which one end side is connected at a cleat portion 223e so as to make a toothcomb shape. Also, on the center portion side of the cleat portion 223e, terminal portion 224 extended in a tab shape from the cleat portion 223e is formed in a protruding shape on the opposite side of the formation side of the third board 223c. On the terminal portion 224, multiple circuit patterns 224a are formed for extending lines from electric circuits so as to connect with contact portions of later-described input portions.

Figure 27:
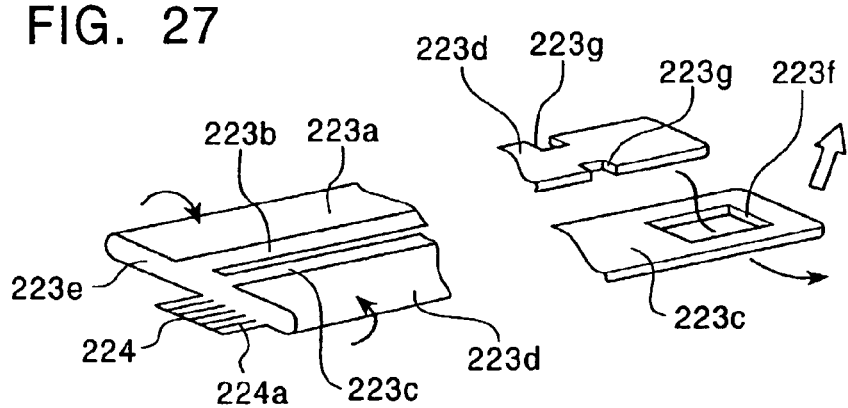
FIG. 27 is a disassembled view of the membrane of the sixth embodiment according to the present invention.

The membrane 223 having the above-described configuration is then processed as follows. As shown in FIG. 26B or 27, a part of the cleat portion 223e on the base portion side of the first board 223a is folded so as to make a layered member 223A by overlaying the second board 223b with the first board 223a, and a part of the cleat portion 223e on the base portion side of the fourth board 223d is folded so as to make a layered member 223B by overlaying the third board 223c with the fourth board 223d, so as a whole, the membrane 223 is processed so as to make a forked shape as shown in FIG. 26B or 27. Also, with an adhesive layer 226 provided close to the surface of the cleat portion 223e that has been folded, the base portion side of the first board 223a adheres to the base portion side of the second board 223b, and the base portion side of the fourth board 223d adheres to the base portion side of the third board 223c.

Next, a slit 223f having a rectangular shape is formed, which penetrates both the tip sides of the second board 223b and the third board 223c in the thickness direction, and notched portions 223g for adjusting the width of each of the boards 223a through 223d so as to be inserted through the slit 223f are provided on both side portions of the tip of the first board 223a and the fourth board 223d. Moreover, the first board 223a abstracts a tip portion 223a1 thereof toward the back side of the second board 223b via the slit 223f of the second board 223b so as to overlap the second board 223b, and similarly, the fourth board 223d abstracts a tip portion 223d1 thereof toward the back side of the third board 223c via the slit 223f of the third board 223c so as to overlap the third board 223c.

The notched portion 223g of the first board 223a is aligned to the inner side edge of the slit 223f of the second board 223b in the state of overlaying the boards 223a and 223b, and similarly, the notched portion 223g of the fourth board 223d is aligned to the inner side edge of the slit 223f of the third board 223c in the state of overlaying the boards 223c and 223d. Both tip sides of the first board 223a and second board 223b are overlaid so as to be relatively slidable for a predetermined distance in a mutual length-wise direction, and both tip sides of the third board 223c and fourth board 223d are overlaid so as to be relatively slidable for a predetermined distance in a mutual length-wise direction.

That is to say, the tip side 223a1 of the first board 223a and the tip side 223b1 of the second board 223b are overlaid so as to be relatively slidable in the range of enabling the notched portion 223g and 223g to be moved along the slit 223f, and similarly, the tip side 223c1 of the third board 223c and the tip side 223d1 of the fourth board 223d are overlaid so as to be relatively slidable in the range of enabling the notched portion 223g and 223g to be moved along the slit 223f.

Figure 28:
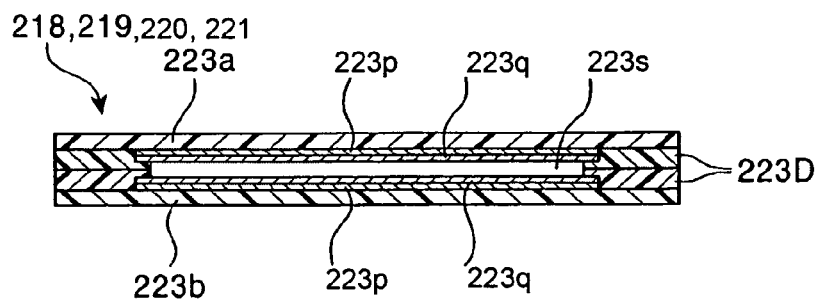
FIG. 28 is a cross-sectional view of the strap body portion of the sixth embodiment according to the present invention.

On the other hand, electrode layers 223p made up of a highly-conductive film to be connected to a circuit pattern 224a of the terminal portion 224 are formed on the front side of each of the first through fourth boards 223a through 223d as shown in FIG. 28 for example, and resistor layers 223q made up of a resistive film are formed on these electrode layers 223p. Also, the peripheral parts of these resistor layers 223q are subjected to overcoating by an insulating resist film 223r with predetermined areas exposed, with each exposed portion forming contact portions 223s and with contact portions having identical planar shapes being formed on the front side of each board 223a through 223d.

Accordingly, due to the first board 223a and second board 223b being overlaid, resistor layers 223B of each board are provided with orientation and predetermined interval distance one to another so as to form switching members (input portions) 218 through 221. The contact portions are used by bowing the opposing resistor layers so as to approach and contact one another.

Now, each terminal of the circuit pattern 224a of the terminal portion 224 of the membrane 223 is connected to one of the electrode layers formed on each front side of the first through fourth boards 223a through 223d, and input signals from the contact portions are transmitted to each terminal of the circuit pattern 224a.

With the switching members 218 through 221 having the above-described configuration, upon applying voltage onto both ends of a resistor layer so as to form the electric field distribution in the direction in which the resistor layer extends, the length-wise positional information of a contact portion can be continuously obtained due to electrical potential extracted from an electrode layer at a connected portion, thereby enabling moving directions and moving speed of fingers sliding over a board to be detected. Accordingly, in the event that a device connected to the terminal plug 217 is the portable audio device 18 described with reference to FIG. 1, for example, this enables the sound volume thereof to be adjusted based on the obtained positional information and moving directions. In the present embodiment, while description has been made with regard to an case of performing volume adjustment using a contact portion, it is needless to say that other functions such as turning power on and off, switching channels, switching tracks of the portable audio device 18, and so forth, may be assigned according to the position of the contact portion.

Moreover, with regard to the switching members 218 through 221 according to the present embodiment, the configurations thereof are not restricted to the configuration having a resistive film and electrode film in a shape such as shown in FIGS. 26 through 29, the following layered structures of the input portion 12 shown in FIGS. 3 and 4, the input portion 44 shown in FIGS. 8 and 9, and the switches with various structures shown in FIGS. 10 through 13, may be employed as suitable.

With the present embodiment, the following functions are assigned as examples: skipping operation to the switching member 218, back-skipping operations to the switching member 219, turning down the volume to the switching member 220, and turning up the volume to the switching member 221, however, it is needless to say that there are no restrictions on assignment of functions.

Figure 29:
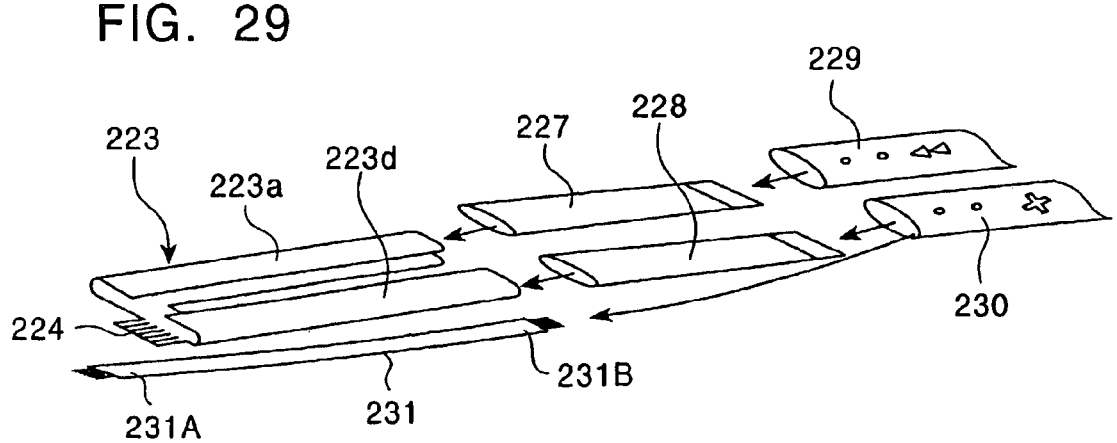
FIG. 29 is a disassembled perspective view of the strap body portion of the sixth embodiment according to the present invention.

With the processed membrane 223 in a forked shape, as shown in FIG. 29, the overlaid portion of the first board 223a and second board 223b is inserted into an elongated bag-shaped waterproof cover 227 such as a polyethylene bag, and the overlaid portion of the third board 223c and fourth board 223d is inserted into an elongated bag-shaped waterproof cover 228 such as a polyethylene bag, and further, these covers are respectively inserted into exterior members 229 and 230 such as an elongated cylinder shaped mesh member so as to be assembled, and furthermore, a flexible wiring board (wiring member) 231 is inserted through the exterior member 230 side which passes through the third board 223c and fourth board 223d, so as to pass through outside of the cover 228. The covers 227 and 228 have one end portion closed and the other end portion opened in a bag shape, and have enough length for covering the entire length of a strip shaped board of the membrane 223.

Accordingly, one strap body 211A is configured with the first board 223a, the second board 223b, the cover 227 for covering these two boards 223a and 223b, and the exterior member 229, and the other strap body 211B is configured with the third board 223c, the fourth board 223d, the cover 228 for covering these two boards 223c and 223d, the flexible wiring board 231, and the exterior member 230.

Furthermore, an edge portion 227a of the cover 227 (shaded area shown in FIG. 26B) located on one side edge of the overlaid first board 223a and the overlaid second board 223b is welded so as to wrap the boards 223a and 223b without any gaps, and also an edge portion 228a of the cover 228 (shaded area shown in FIG. 26B) located on one side edge of the overlaid third board 223c and the overlaid fourth board 223d is welded so as to wrap the boards 223c and 223d without any gaps.

Figure 30A:
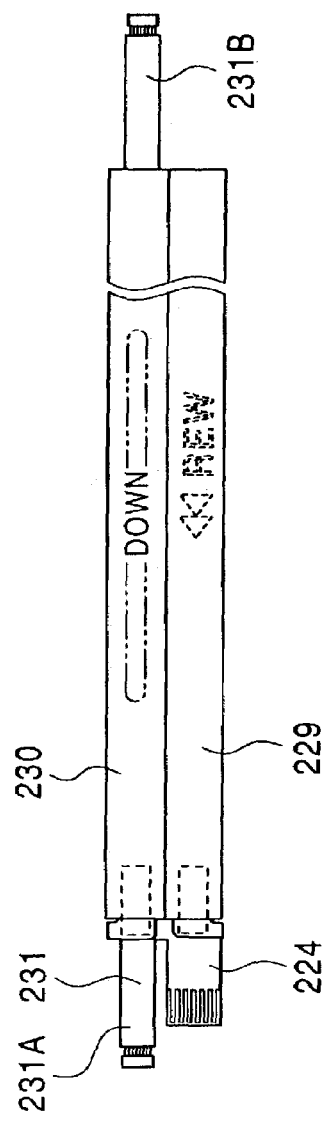
FIGS. 30A and 30B are schematic perspective views of the strap body portion and the coated member of the sixth embodiment according to the present invention.
Figure 30B:
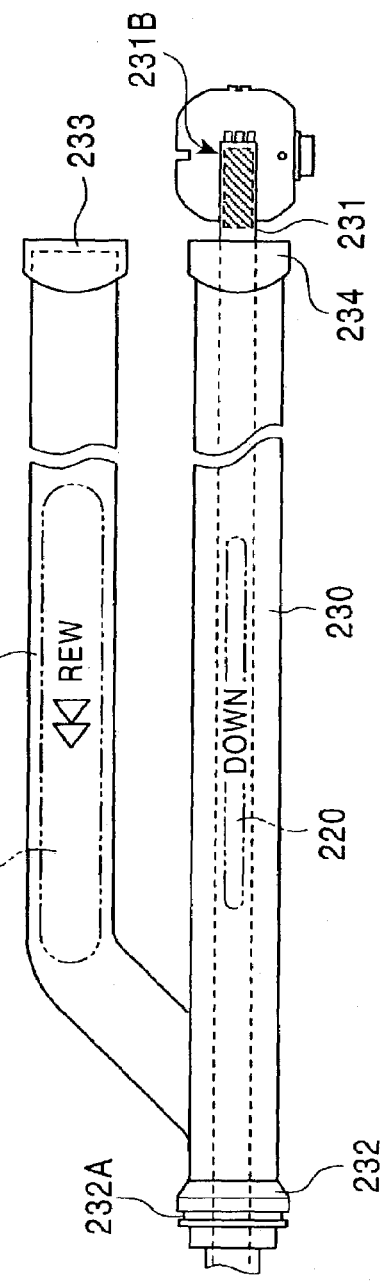

As shown in FIG. 30A, the terminal portion 224 of the membrane 223 and one end 231A of the flexible wiring board 231 are extracted by a required length from one end portion side of exterior members 229 and 230, and a coated member (mold member) made up of resin mold is provided on the front side where the exterior members 229 and 230 are overlaid, whereby both exterior members are bundled. With the side divided in a forked shape of the exterior members 229 and 230, coated members 233 and 234 made up of resin mold are provided on each front side of another end portion side thereof. Also, the other end portion 231B of the flexible wiring board 231 is extracted by a required length from the other end portion side of the exterior member 230.

Figure 31:
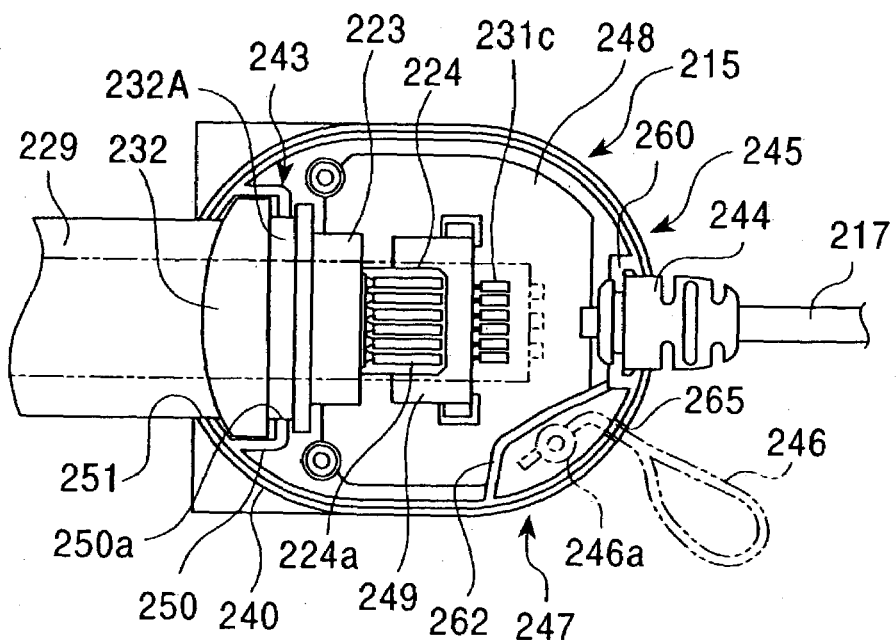
FIG. 31 is a disassembled perspective view for describing a state that the strap body portion of the sixth embodiment according to the present invention is joined to a bottom case member of a connecting member.

With the strap bodies 229 and 230, the side where the coated member 232 is formed is connected to the connecting member 215. The connecting member 215 has a planar racetrack-like shape and a hollow structure including a thin bottom case member 240 with an opened top side, and a thin upper case member 241 with an opened bottom side. As shown in FIG. 31, a first reception portion (double wall structure portion) 243 is formed on one side inside of the bottom case member 240 so as to accommodate the end portion of the exterior member 229 and part of the coated member 232, and a second reception portion (double wall structure portion) 245 is formed on the other side inside of the bottom case member 240 so as to accommodate part of a base portion connector 244 of the connecting cord 217. A third reception portion (double wall structure portion) 247 adjacent to the second reception portion 245 is formed so as to accommodate a base portion 246a of a string member 246 in a looped shape for suspending, and furthermore, a mounting board 248 for wiring connection, a connector 249, switching members not shown in the drawing and so forth, are accommodated.

With the first reception portion 243, an insertion slot 251 is formed for introducing an end portion of the exterior member 229 into part of the outer wall of the bottom case member 240, and an internal wall 250 is formed for surrounding generally half of the thickness of the coated member 232 introduced into the connecting member 215 via the insertion slot 251. Also, inside of the internal wall 250, a concave portion 250a is formed for retaining a peripheral groove portion 232A formed on the coated member 232, and the membrane 223 of the exterior member 229 is introduced so as to straddle the concave portion 250a, such that the circuit pattern 224a of the terminal portion 224 of the membrane 223 is electrically connected to part of the circuits of the connector 249 on the board 248. Also, a wiring tip portion 231c of the flexible wiring board 231 extracted from an end portion of the exterior member 229 is electrically connected to part of the circuits of the connector 249.

The second reception portion 245 has a double wall structure wherein an internal wall 260 with a size sufficient for covering the tip portion of the connector 244 of the connecting cord 217 is provided inside of the peripheral wall of the bottom case member 240, and the connector 244 for the connecting cord 217 is joined so as to pass through part of the peripheral wall of the bottom case member 240 and part of the internal wall 260 inside of the peripheral wall of the bottom case member 240. Also, the third reception portion 247 has a configuration wherein an internal wall 262, forming a space to accommodate a base portion 246a which is a knot in the string member 246, is provided inside of the peripheral wall of the bottom case member 240, and the string member 246 is inserted through a through hole 265 formed on part of the outer wall of the bottom case member 240. The first through third reception portions 243, 245 and 247 are provided for improving waterproofing of the connecting member 215.

Figure 32:
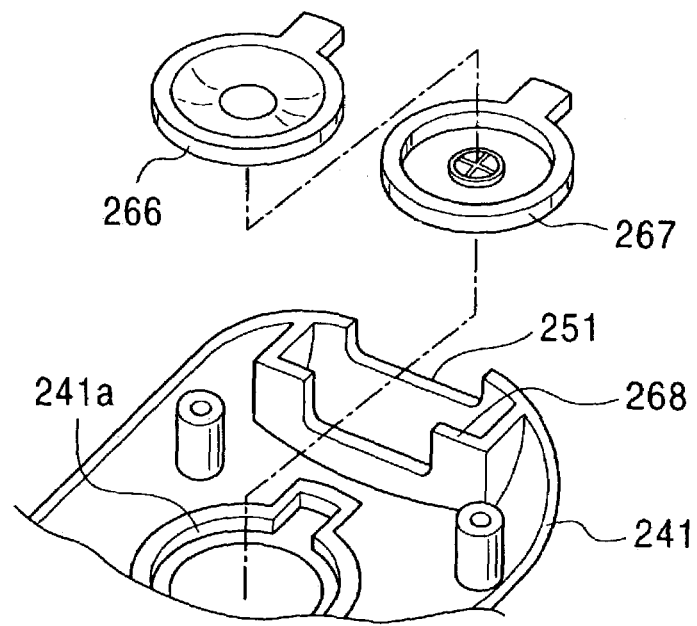
FIG. 32 is a schematic perspective view illustrating the upper case member of the connecting member of the sixth embodiment according to the present invention.

On the bottom case member 240 of the connecting member 215, an upper case member 241 with a sufficient size for closing the bottom case member 240 shown in FIG. 32 is integrated thereon by junction means such as a screw clamp. A through hole 241a is formed on the center portion of the upper case member 241, and a disc-shaped seal member 266 and disc-shaped key-top member 267 made up of waterproof rubber are provided so as to mount on the through hole 241a from inside. The key-top member 267 comprises a push button for operating a switching device not shown in FIGS. 31 and 32. An internal wall 268 serving the same function as the first reception portion 243 of the bottom case member 240 is provided inside of the peripheral wall of the upper case member 241. The internal wall 268 has a configuration wherein, in the event of integrating the upper case member 241 into the bottom case member 240, the coated member 232 can be covered by configuring the first reception portion with the internal wall 250 covering generally half of the thickness of the coated member 232.

Now, a double wall structure is employed inside of the other side of the upper case member 241 wherein the internal wall 260 of the second reception portion 245 of the bottom case member 240 and the internal wall covering generally half of the thickness of the tip portion of the connector 244 are configured, and the internal wall of the third reception portion 247 of the bottom case member 240 and the internal wall covering the base portion 246a of the string member 246 are configured, however, the double wall structure portion of the upper case member 241 is omitted in FIG. 32.

Accordingly, with the connecting member 215, the end portion side of the exterior member 229, the coated member 232, part of the connector 244 of the connecting cord 217, and the string member 246, are connected thereto in a state of improved waterproofing, owing to the first through third reception portions of the bottom case member 240 and upper case member 241.

Figure 33:
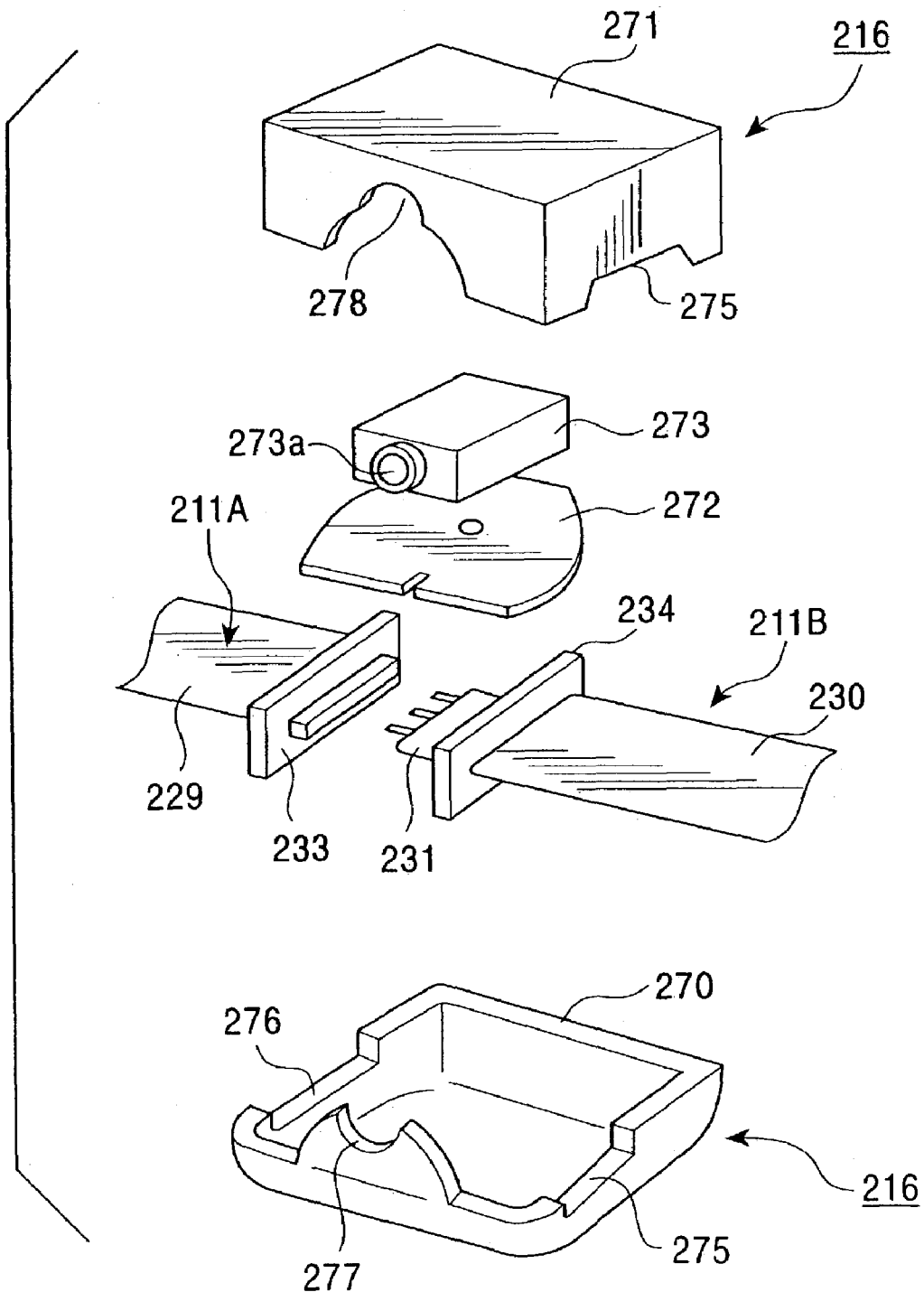
FIG. 33 is a disassembled perspective view illustrating another connecting member of the sixth embodiment according to the present invention.
Figure 34:
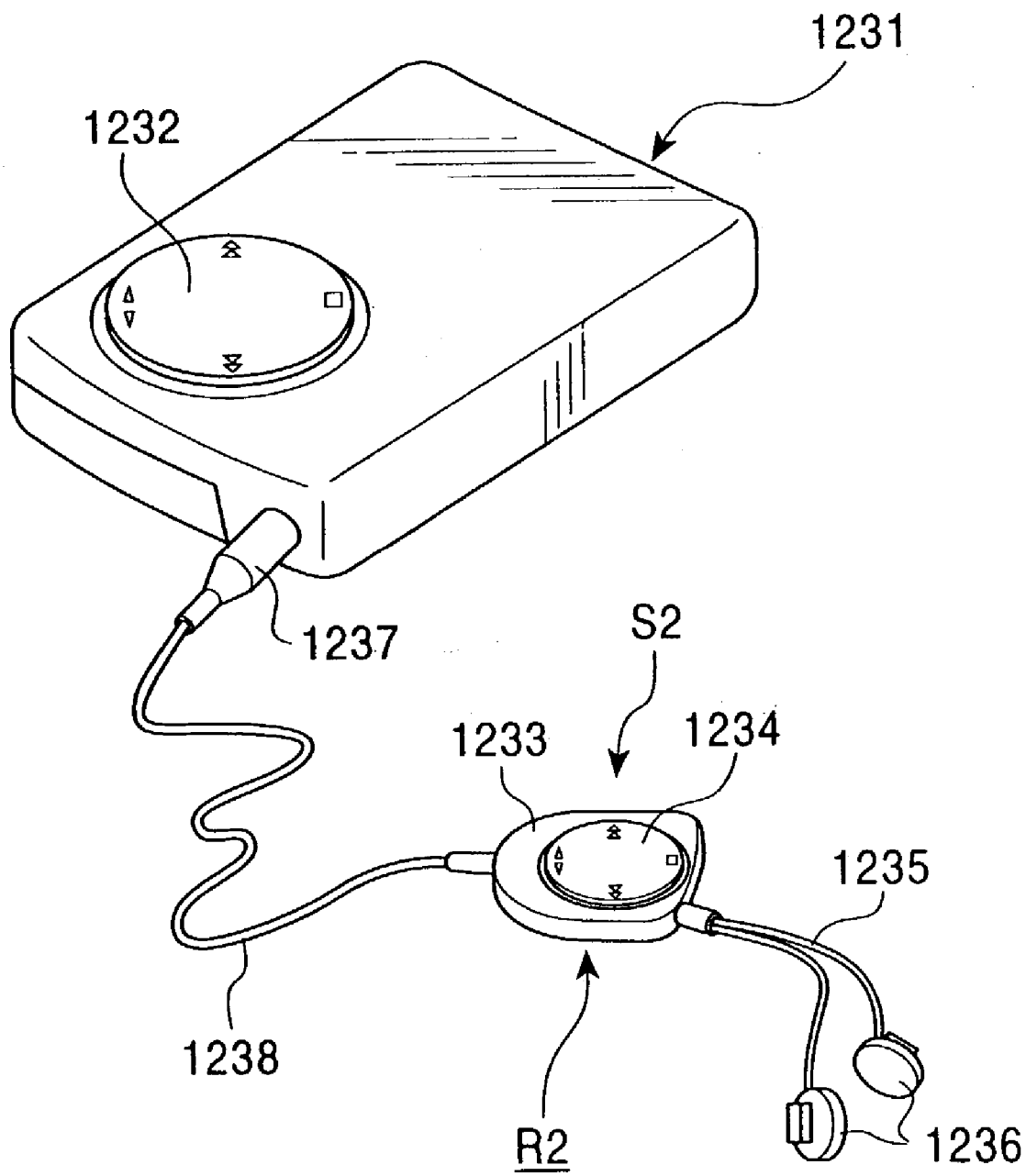
FIG. 34 is a diagram illustrating a portable audio device having a conventional remote control device.

Next, with the end portion of the opposite side of the exterior members 229 and 230, the second connecting member 216, of which a disassembled configuration is shown in FIG. 33, is connected thereto. The second connecting member 216 is formed in a box shape made up of a bottom case member 270 and upper case member 271, and a board 272 and terminal box 273 for a connecting terminal block are stored inside of the connecting member 216, and the other edge portion side of the strap bodies 229 and 230 are introduced inside of the connecting member 216 via concave portions 275 and 276 formed on both side portions of the bottom case member 270 and upper case member 271, and the coated members 233 and 234 are stored inside of the connecting member 216, with the exterior members 229 and 230 being supported so as not to come off 229 and 230 are introduced inside of the connecting member 216 via concave portions 275 and 276 formed on both side portions of the bottom case member 270 and upper case member 271, and the coated members 233 and 234 are stored inside of the connecting member 216, with the exterior members 229 and 230 being supported so as not to come off. Further, note that hole portions 277 and 278 for exposing a terminal 273a of a terminal box 273 are formed on the front side of the bottom case member 270 and upper case member 271, thereby enabling additional connection terminals such as earphones, headphones, or the like to be connected to the terminal 273a from outside.

The strap controller 200 having the configuration such as described above is used with the connecting member 215 side placed on the chest side, the connecting member 216 faces back placed on the neck, the strap bodies 211A and 211B connected in a looped shape put around the neck, and the terminal plug 217A connected to the portable audio device 18 shown in FIG. 1, for example.

At the time of using the strap controller, the switching members 218 through 221 built into in any of the strap bodies 211A and 211B are pinched with fingers so as to effect contact between the resistor layers facing one another, in the same manner as with the strap controller having the structure described above with reference to FIG. 1, whereby switching or volume adjusting functions are performed, and the portable audio device 18 is used in the same manner as the first embodiment.

Moreover, playback/stop operations of the portable audio device 18 and permission/prohibition control of operations of the input portions or switch portions provided on the strap bodies 211A and 211B can be performed in the same way as with the first embodiment by operating the key-top member 267 to change the button switch device within the connecting portion 215.

Furthermore, with the strap controller 200 according to the present embodiment, the electrode layers formed on each of the boards 233a through 233d of the membrane 233 are covered with the covers 227 and 228, thereby enabling waterproofing of the electrode layers to be improved.

With this kind of switching devices, though silver electrode layers formed by applying and baking silver paste as construction material are often used, the silver electrode layers readily bring about a state referred to as metal migration due to corrosion resulting from the presence of water, and in the event that metal migration occurs, dendrite grows up on the silver electrode layers, leading to problems such as short-circuiting between opposed layers, or the like. With regard to this point, covering the electrode layers with the covers 227 and 228 prevents the electrode layers from intrusion of moisture. That is to say, with the strap controller 200 hung from the neck, intrusion of moisture to electrode layers due to presence of rain and humidity can be prevented, thereby realizing excellent advantages of preventing metal migration.

Moreover, in order to obtain sufficient improvement in waterproofing as described above, the position where the coated member 232 bundling the strap bodies 211A and 211B is formed should be where the boards 223a through 223d of the membrane 223 are packaged with the covers 227 and 228, and bundling both strap bodies with the coated member so as to put them under restraint improves waterproofing. For example, in the event of using the strap bodies in the rain or fog, even if moisture settles on the exterior members 229 and 230, intrusion of moisture for the electrode layer side of the membrane 223 can be prevented, and consequently, corrosion of electrode layers and metal migration can be prevented. Also, the coated member 232 is provided inside of the connecting member 215 via the double wall structure of the connecting member 215, thereby enabling waterproofing to be improved at portions around the connecting member 215.

Furthermore, the double wall structure is employed on the following portions: the portion where the connector 244 of the connecting cord 217 is connected to the connecting member 215, and the portion where the string member 246 is connected to the connecting member 215, thereby enabling waterproofing at these portions to be improved. Now, with the flexible wiring board 231, wiring is covered with resin, so there could be little corrosion of the wiring portions, and accordingly, the wiring portions are not covered with the covers 227 and 228. Nevertheless, it is needless to say that the wiring portions of the flexible wiring board 231 may be additionally covered with the covers 227 and 228 or other covers to improve waterproofing property if necessary.

Moreover, with the strap controller 200 having the above-described configuration, in the event of folding the strap bodies 211A and 211B, the first board 223a and second board 223b can have layer slippage in the range where the tip portion of the first board 223a having the notched portion 223g can slide along the slit 223f, and the third board 223c and fourth board 223d can have layer slippage in the range where the tip portion of the fourth board 223d having the notched portion 223g can slide along the slit 223f, so flexibility of the strap bodies 211A and 211B is good and there is little possibility that the distance between the opposed boards might be changed in the event of folding the strap bodies 211A and 211B. Now, in the event that both sides of the opposed boards are bundled, the opposed boards cannot slide as a result of folding the strap bodies 211A and 211B, so the board located outside of the folding portion will partially curl up from the board located inside of the folding portion, and accordingly, there is a high possibility that the distance between the opposed boards might be changed, and switching operation could not be performed smoothly at the portion where the board is curled up. In this point as described above, the configuration wherein the opposed boards can have layer slippage when folding the strap bodies allows switching operation to be performed smoothly in a sure manner.

Furthermore, in the event of using the strap controller 200 hung from the neck, the terminal 273a of the terminal box 273 of the second connecting member 216 is located at back of the neck, so music played back from the portable audio device 18 can be listened to by inserting a connection terminal of earphones or headphones or the like into the terminal 273a. With the strap controller 200 having such a configuration, the second connecting member 216 is located immediately close to the ears of the user, so earphones or headphones or the like can be readily connected, and furthermore, the length of these connecting cords can be reduced.

Also, upon operating the switching members 218 through 221, the following functions are available: skipping operations of the portable audio device 18, back-skipping operations, turning down the volume, and turning up the volume. The strap controller according to the present invention is a neck-hung type, accordingly, in the event of performing back-skipping operation of the switching member 218, these operations can be readily performed by stroking the contact portion of the switching member 218 downward or gripping a part thereof, similarly, turning down the volume can be readily performed by stroking the switching member 220 downward. In these cases, operation can be performed with one hand because the strap is hung around the neck and restricted in downward movement, thereby enabling excellent operability to be obtained. Conversely, in the event of skipping or turning up the volume, the operations can be readily performed by stroking the switching member 219 or 221 upwards or gripping a part thereof while holding a part of the strap with one hand.

What is claimed is:

1. An input device comprising:
   a neck-hung strap; and
   a connecting member connecting the strap, the strap having a loop-shaped configuration;

the strap having at least one input portion embedded therein, and the strap being elongated and flexible;

an electronic device remote from the strap and input portion, the electronic device configured to perform functions in response to control signals received from the input portion; and wherein the at least one input portion is operable to control the functions of the remote electronic device so that the electronic device performs the functions based on the control signals transmitted by the input portion and wherein the at least one input portion performs various types of inputs based on opposing resistor layers or electrode layers having predetermined lengths of one and the other boards and sliding the at least one input portion in a length-wise direction of a band-shaped strap.

2. An input device according to claim 1, further comprising wireless communication means.

3. An input device according to claim 1, wherein permission/prohibition for operation as to said input portion is switchable with an operating member provided on said connecting member.

4. An electronic device, comprising the input device according to claim 1.

5. The input device according to claim 1, wherein the connecting member includes a connection between the at least one input portion and the remote electronic device.

6. The input device according to claim 1, wherein the input portion is completely covered by the strap.

7. The input device according to claim 1, wherein the input portion is manually operable as a switching device.

8. The input device according to claim 1, wherein the at least one input portion is formed in a strap shape and positional information can be output along a direction in which the at least one input portion extends.

9. An input device comprising:

a wearable strap; and a connecting member capable of connecting the strap in a plurality of shapes;

wherein at least one input portion is disposed within the strap; and wherein the at least one input portion is operable to control functions of a remote electronic device by transmitting control signals to the electronic device, the electronic device being remote from both the strap and the input portion, and responsive to the control signals transmitted by the input portion and wherein the at least one input portion performs various types of inputs based on opposing resistor layers or electrode layers having predetermined lengths of one and the other boards and sliding the at least one input portion in a length-wise direction of a band-shaped strap.

* * * * *

UNITED STATES PATENT AND TRADEMARK OFFICE
CERTIFICATE OF CORRECTION

PATENT NO. : 7,583,508 B2  Page 1 of 1
APPLICATION NO. : 10/434757
DATED : September 1, 2009
INVENTOR(S) : Hagiwara et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 777 days.

Signed and Sealed this

Fourteenth Day of September, 2010

David J. Kappos
*Director of the United States Patent and Trademark Office*